US011222054B2

(12) United States Patent
Atasu et al.

(10) Patent No.: US 11,222,054 B2
(45) Date of Patent: Jan. 11, 2022

(54) LOW-COMPLEXITY METHODS FOR ASSESSING DISTANCES BETWEEN PAIRS OF DOCUMENTS

(71) Applicant: International Business Machines Corporation, Armonk, NY (US)

(72) Inventors: Kubilay Atasu, Rueschlikon (CH); Cesar Berrospi Ramis, Zurich (CH); Nikolas Ioannou, Zurich (CH); Thomas Patrick Parnell, Zurich (CH); Charalampos Pozidis, Thalwil (CH); Vasileios Vasileiadis, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 15/918,963

(22) Filed: Mar. 12, 2018

(65) Prior Publication Data

US 2019/0278850 A1 Sep. 12, 2019

(51) Int. Cl.
*G06F 16/33* (2019.01)
*G06F 17/16* (2006.01)
(Continued)

(52) U.S. Cl.
CPC .......... *G06F 16/3347* (2019.01); *G06F 16/31* (2019.01); *G06F 17/16* (2013.01);
(Continued)

(58) Field of Classification Search
CPC ...... G06F 16/3347; G06F 16/31; G06F 17/16; G06F 40/216; G06F 40/284;
(Continued)

(56) References Cited

U.S. PATENT DOCUMENTS 6,523,026 B1 * 2/2003 Gillis ................. G06F 16/3332
7,567,958 B1 * 7/2009 Alspector .......... G06Q 30/0255
(Continued)

FOREIGN PATENT DOCUMENTS

CN 106649561 A 5/2017

OTHER PUBLICATIONS

Georgios-Ioannis Brokos et al., Using centroids of word embeddings and word mover's distance for biomedical document retrieval in question answering, Proceedings of the 15th Workshop on Biomedical Natural Language Processing, pp. 114-118, Berlin, Germany, Aug. 12, 2016.
(Continued)

*Primary Examiner* — Phong H Nguyen
(74) *Attorney, Agent, or Firm* — Daniel Morris; Otterstedt, Wallace & Kammer, LLP

(57) ABSTRACT

Two sets $X_2$ and $X_1$ of histograms of words, and a vocabulary V are accessed. Each of the two sets is representable as a sparse matrix, each row of which corresponds to a histogram. Each histogram is representable as a sparse vector, whose dimension is determined by a dimension of the vocabulary. Two phases compute distances between pairs of histograms. The first phase includes computations performed for each histogram and for each word in the vocabulary to obtain a dense, floating-point vector y. The second phase includes computing, for each histogram, a sparse-matrix, dense-vector multiplication between a matrix-representation of the set $X_1$ of histograms and the vector y. The multiplication is performed to obtain distances between all histograms of the set $X_1$ and each histogram $X_2[j]$. Distances between all pairs of histograms are obtained, based on which distances between documents can subsequently be assessed.

25 Claims, 7 Drawing Sheets

(51) Int. Cl.
*G06K 9/00* (2006.01)
*G06K 9/62* (2006.01)
*G06F 16/31* (2019.01)

(52) U.S. Cl.
CPC ....... *G06K 9/00442* (2013.01); *G06K 9/6212* (2013.01); *G06K 9/6215* (2013.01)

(58) Field of Classification Search
CPC ... G06F 40/237; G06F 40/30; G06K 9/00442; G06K 9/6215; G06K 9/6212; G06K 9/00483
USPC .................................................. 707/728, 749
See application file for complete search history.

(56) References Cited

U.S. PATENT DOCUMENTS

| | | | | |
|---|---|---|---|---|
| 8,549,529 | B1* | 10/2013 | Schildan | G06F 9/5038 |
| | | | | 718/104 |
| 8,594,239 | B2 | 11/2013 | Manasse et al. | |
| 8,650,199 | B1 | 2/2014 | Tong | |
| 8,965,134 | B2* | 2/2015 | Kompalli | G06K 9/00456 |
| | | | | 382/212 |
| 9,235,624 | B2 | 1/2016 | Zhou | |
| 9,753,916 | B2* | 9/2017 | Aharoni | G10L 13/027 |
| 2004/0156545 | A1* | 8/2004 | Kim | H04N 21/44008 |
| | | | | 382/170 |
| 2007/0250502 | A1* | 10/2007 | Canright | G06F 16/35 |
| 2011/0270851 | A1* | 11/2011 | Mishina | G06F 16/90339 |
| | | | | 707/749 |
| 2014/0029857 | A1* | 1/2014 | Kompalli | G06K 9/00483 |
| | | | | 382/212 |
| 2015/0371651 | A1* | 12/2015 | Aharoni | G06F 40/56 |
| | | | | 704/201 |
| 2015/0380087 | A1* | 12/2015 | Mittelholzer | H03M 13/2767 |
| | | | | 714/766 |
| 2017/0228435 | A1* | 8/2017 | Tacchi | G06F 16/3344 |
| 2018/0330258 | A1* | 11/2018 | Harris | G06N 5/003 |
| 2019/0164109 | A1* | 5/2019 | Suhara | G06Q 10/1053 |
| 2020/0402289 | A1* | 12/2020 | Risser | G06T 11/001 |

OTHER PUBLICATIONS

M Heimann, WMD algorithm, pp. 1-2, downloaded Jun. 30, 2017 from https://algorithmia.com/algorithms.mheimann/wmd.

Yossi Rubner et al., A Metric for Distributions with Applications to Image Databases, Proceedings of the 1998 IEEE International Conference on Computer Vision, Bombay, India, 1998, pp. 1-8.

Matt J. Kusner et al., From Word Embeddings To Document Distances, Proceedings of the 32nd International Conference on Machine Learning, Lille, France, 2015, pp. 1-10.

Ofir Pele and Michael Werman. Fast Earth Mover's Distance (EMD) Code, 2013, Downloaded Mar. 9, 2018 From https://github.com/wmayner/pyemd, pp. 1-4.

Elizaveta Levina et al., The EarthMover's Distance is the Mallows Distance: Some Insights from Statistics, In Proceedings ICCV, 2001, pp. 1-6.

Tomas Mikolov et al., Efficient estimation of word representations in vector space. CoRR, abs/1301.3781, 2013, pp. 1-12.

* cited by examiner

LOW-COMPLEXITY METHODS FOR ASSESSING DISTANCES BETWEEN PAIRS OF DOCUMENTS

BACKGROUND

The invention relates in general to the field of computer-implemented methods for assessing distances between pairs of documents, such as methods known as Word Mover's Distance and Relaxed Word Mover's Distance.

Modern computational systems are known, which are capable of ingesting, storing and searching across a prodigious amount of textual information. Efficient search through textual information should ideally allow both high-quality results and speed of execution. Today, high-quality search results can be achieved thanks to a new class of text representations based on neural networks, such as the popular word2vec representation [1]. The algorithm word2vec capitalizes on neural networks to map words onto an appropriate vector space. In this embedding space, words that are semantically synonymous will be close to each other. To capture the similarity between sentences, Kusner et al., proposed the Word Mover's Distance (WMD) [2], which represents a promising method for evaluating the similarity between text documents, in terms of quality of search results obtained. WMD is an adaptation of the Earth Mover's Distance (EMD) [3], initially proposed to measure similarity between images. Like EMD, WMD constructs a histogram representation of the documents and estimates the cost of transforming one histogram into the other. However, the computational complexity of both approaches scales cubically with the size of the histograms, making their application prohibitive on Big Data.

To mitigate the large complexity of WMD, Kusner et al., proposed using a faster, lower-bound approximation to WMD, called the Relaxed Word Mover's Distance, or RWMD [2]. They showed that the accuracy achieved by RWMD is very close to that of WMD. According to the original paper, the time complexity of the RWMD method grows quadratically with the size of the histograms, which represents a significant improvement with respect to the WMD method. However, quadratic complexity still limits the applicability of RWMD to relatively small datasets. Such a complexity still prevents computing pairwise similarities across millions of documents, which would have extensive applications in clustering, classification, and querying of documents.

SUMMARY

According to a first aspect, the present invention is embodied as a computer-implemented method for assessing distances between pairs of documents. This method first comprises accessing: two sets $X_2$ and $X_1$ of histograms of words, where each of the histograms pertains to a respective document; and a vocabulary V of words. Each of the two sets $X_k$, k=1, 2, is representable as a sparse matrix, each row of which corresponds to a histogram $X_k[l] \in X_k$, $l \in \{1, \ldots, N_k\}$. In addition, each histogram $X_k[l]$ is representable as a sparse vector, whose dimension is determined by a dimension of the vocabulary V.

The present methods essentially comprise two phases, which aim at computing distances between pairs of histograms $(X_1[i], X_2[j])$, $\forall i \in \{1, \ldots, N_1\} \land \forall j \in \{1, \ldots, N_2\}$. The first phase include computations performed for each histogram $X_2[j] \in X_2$ and for each word in the vocabulary V. There, a distance between said each word in V and a closest entry in said each histogram $X_2[j]$ is computed, so as to obtain a dense, floating-point vector)), whose dimension is determined by the dimension of the vocabulary V.

The second phase includes computing, again for said each histogram $X_2[j] \in X_2$, a sparse-matrix, dense-vector multiplication between a matrix-representation of the set $X_1$ of histograms and the vector y (as computed during the first phase for said each histogram $X_2[j] \in X_2$). The multiplication is performed as a matrix-vector product, in order to obtain distances between all histograms $X_1[i]$, $i \in \{1, \ldots, N_1\}$ of the set $X_1$ and said each histogram $X_2[j]$. ATM. Performing the two-phase process for each histogram $X_2[j]$ allow distances between all pairs of histograms to be obtained, based on which distances between documents can subsequently be assessed.

This approach makes it possible to markedly reduce the time complexity and storage requirements, compared to methods such as WMD and RWMD, while essentially retaining the quality of search results obtained. This, in practice, makes it possible for high-quality search results such as provided by the WMD and RWMD methods applicable to massive datasets.

In embodiments, the vector y is computed based on: a dense matrix W that stores vector representations of words in the vocabulary V, and a dense matrix $T_2[j]$ that stores vector representations of words in $X_2[j]$. For example, the vector y is preferably computed as $\min(W \circ T_2[j]^T)$, where $\circ$ is a modified matrix multiplication operation, wherein distances are computed between word vectors of W and $T_2[j]^T$. Row-wise minimums of $W \circ T_2[j]^T$ are then computed to obtain $\min(W \circ T_2[j]^T)$. This way, minimal distances between the words in the vocabulary V and the words in $X_2[j]$ can be obtained, which are stored in the vector y, in view of the subsequent sparse-matrix, dense-vector multiplication.

The above embodiments makes it possible to compute the costs of moving histograms $X_1[i]$, $i \in \{1 \ldots N_1\}$ to histograms $X_2[j]$, $j \in \{1 \ldots N_2\}$. Now, a tighter lower bound can be achieved by further computing the costs of moving histograms $X_2[j]$, $j \in \{1 \ldots N_2\}$ to $X_1[i]$, $i \in \{1 \ldots N_1\}$. That is, the above two-phase process can be repeated, wherein $X_1$ and $X_2$ are swapped and the new round of computations are now run for each $X_1[i]$.

According to another aspect, the invention is embodied as a computerized method for managing sets of documents. This additional method assumes that, given a set $X_1$ of histograms of words, where each of the histograms pertains to a respective document, the set $X_1$ corresponds to a first set of documents as currently stored in a pool of documents. Now, a new set (i.e., a second set) of documents may be received. There, a corresponding set $X_2$ of histograms of words is created, wherein each histogram pertains to a respective document of the new set of documents received. Finally, distances between pairs of documents of the two sets can be assessed, according to embodiments of the method described above.

The new set of documents is preferably stored in the pool of documents after having assessed distances between pairs of documents of the two sets.

According to a final aspect, the invention can be embodied as a computer program product for assessing distances between pairs of documents. The computer program product comprises a computer readable storage medium having program instructions embodied therewith. The program instructions are executable by one or more processors, to cause the latter to implement steps according to the present methods.

Computerized methods and computer program products embodying the present invention will now be described, by way of non-limiting examples, and in reference to the accompanying drawings.

BRIEF DESCRIPTION OF THE DRAWINGS

The accompanying drawings show simplified representations of methods, devices or parts thereof, as involved in embodiments. Similar or functionally similar elements in the figures have been allocated the same numeral references, unless otherwise indicated.

DETAILED DESCRIPTION

The aim of the present invention is to propose a low-complexity method for accurately assessing distances between pairs of documents, which reduces the average time complexity when operating on large sets of documents. In specific embodiments (see sect. 2), a linear-complexity implementation of the RWMD method is achieved (henceforth referred to as LC-RWMD), which is functionally equivalent to the quadratic-complexity RWMD but results in orders of magnitude reduction of the runtime.

The following description is structured as follows. First, general embodiments and high-level variants are described (sect. 1). The next sections addresses more specific embodiments (sect. 2) and technical implementation details (sect. 3).

a. General Embodiments and High-Level Variants

In reference to FIGS. 1-5, a first aspect of the invention is described, which concerns a computer-implemented method for assessing distances between pairs of documents.

Figure 1:
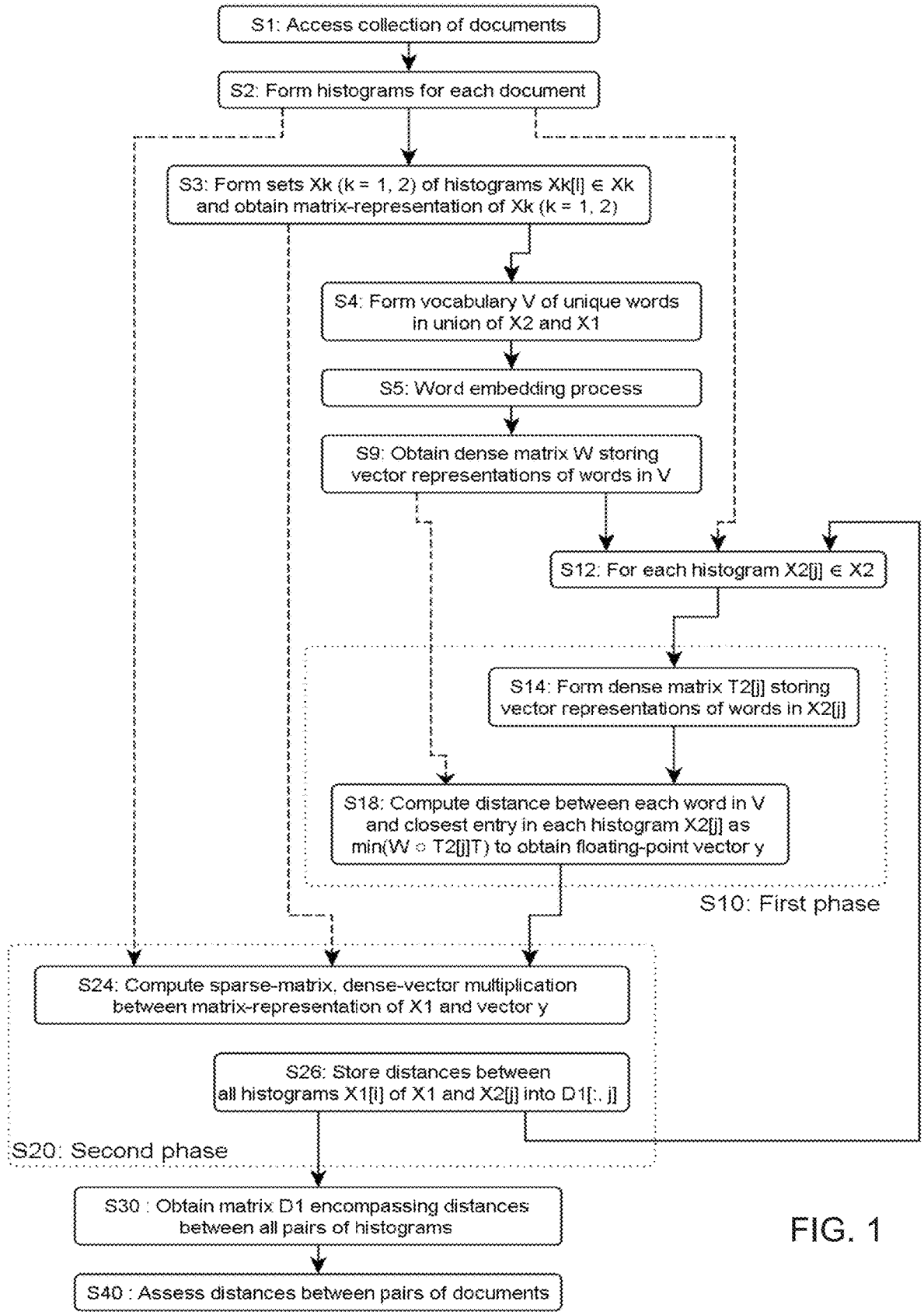
FIGS. 1-3 are flowcharts illustrating high-level steps of methods for assessing distances between pairs of documents, according to embodiments.
Figure 2:
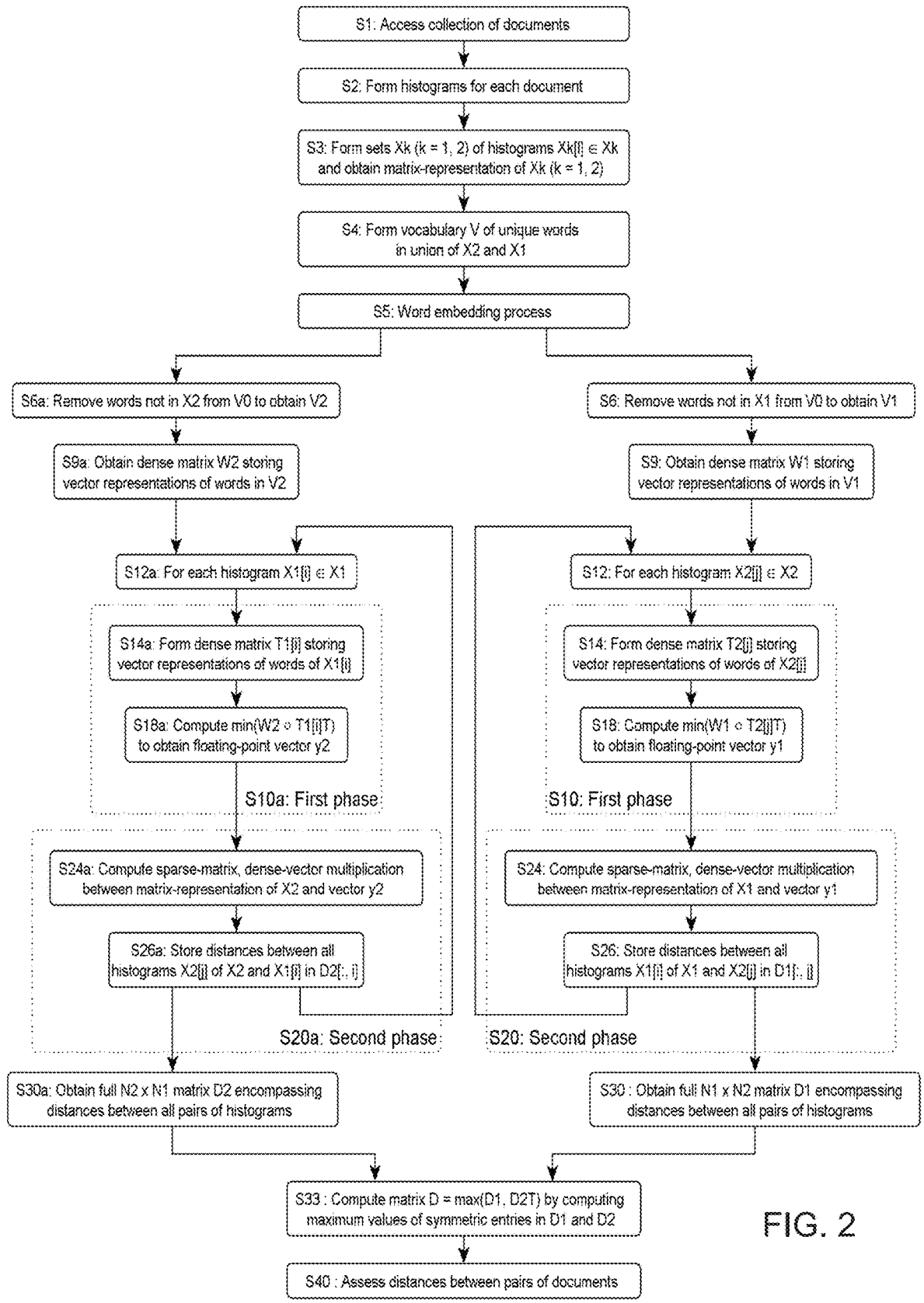
Figure 3:
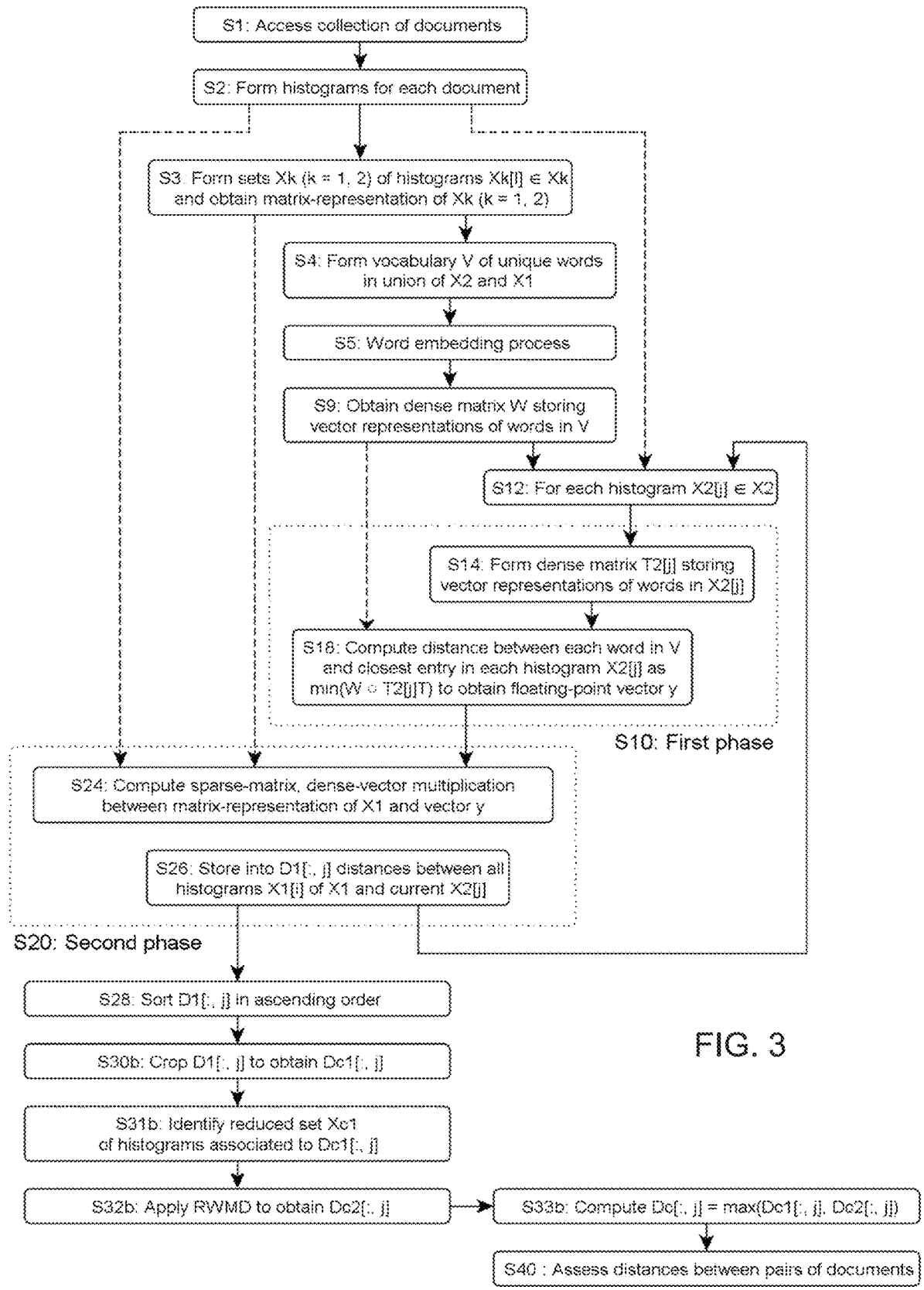
Figure 4A:
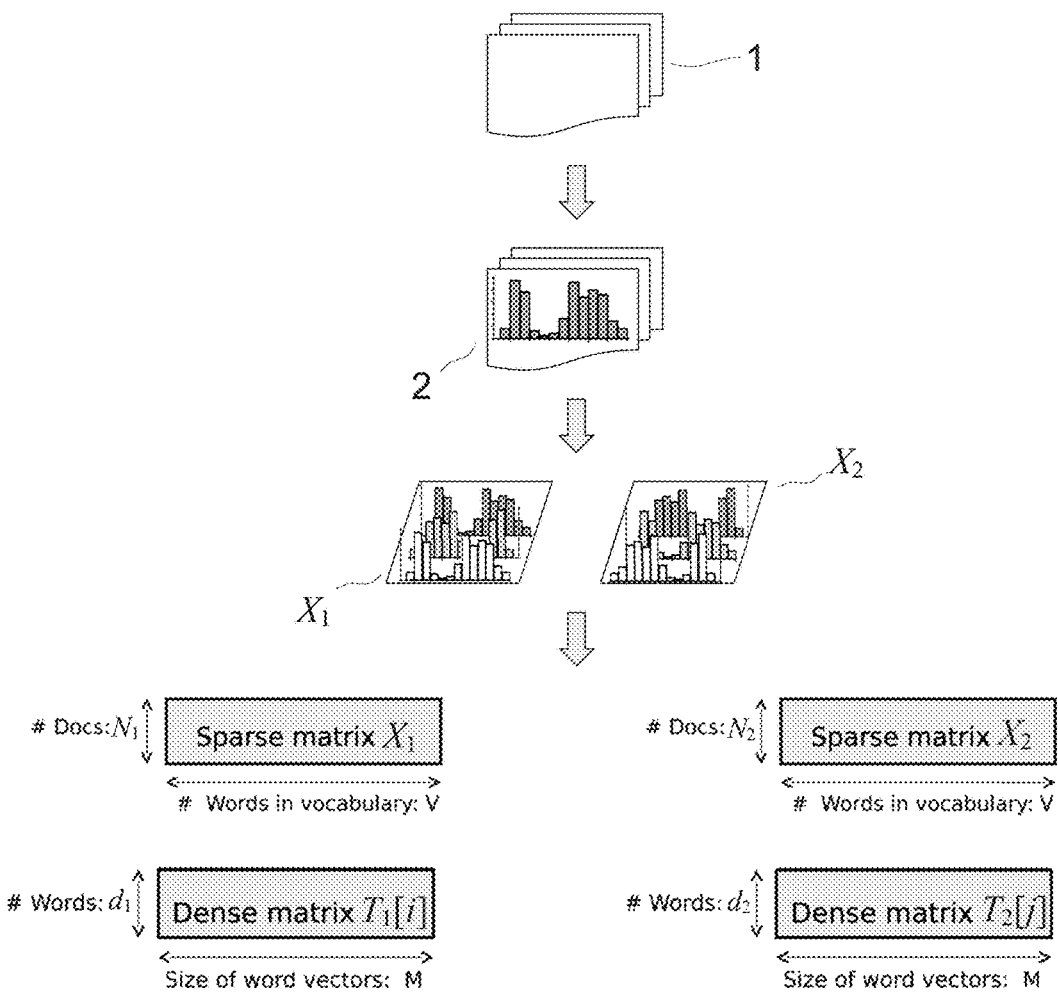
FIGS. 4A-4B (collectively FIG. 4) and FIGS. 5A and 5B (collectively FIG. 5) schematically depict components (documents, histograms, sets of histograms, vocabulary) and data structures (matrices, vectors) as involved in embodiments of the present methods.

Basically, this method relies on two sets $X_2$, and $X_1$ of histograms 2 of words and a vocabulary V of words, which are accessed at steps S1-S9, see the flowcharts of FIGS. 1-3. Each histogram 2 of each set $X_1$ or $X_2$ pertains to a respective document 1, as schematically depicted in FIG. 4A. That is, each document 1 is represented as a histogram 2 of words, as commonly used in the context of WMD and RWMD methods. As known per se, a histogram can be derived from a text document, so as to store the weights (e.g., term frequencies) of words (e.g., unique words) in that document.

Histograms 2 are then grouped into sets $X_k$, k=1, 2, as illustrated in FIG. 4A. In practice, the second set $X_2$ may for instance correspond to a newly received set of documents that need be compared to an existing (i.e., already stored) set $X_1$ of documents, as in another aspect of the invention, later described in reference to FIG. 6.

Each of the two sets $X_k$, k=1, 2, is assumed to be representable as a sparse matrix, each row of which corresponds to a histogram $X_k[l] \in X_k$, $l \in \{1, \ldots, N_k\}$. In addition, each histogram $X_k[l]$ is representable as a sparse vector, whose dimension is determined by the dimension (hereafter noted of the vocabulary V, as in the context of WAD and RWMD methods. See FIGS. 4A, 4B for an illustration.

The present methods essentially comprise two phases S10, S20, which aim at computing distances between pairs of histograms $(X_1[i], X_2[j])$, $\forall\ i \in \{1, \ldots, N_1\} \land \forall\ j \in \{1, \ldots, N_2\}$. Each of the two phases S10, S20 is designed so that it need be performed for each histogram $X_2[j] \in X_2$.

The first phase S10 includes computations performed for each histogram $X[j] \in X_2$ and, in addition, for each word w in the vocabulary V. In detail, a distance between said each word in V and a closest entry (i.e., in terms of distance) in said each histogram $X_2[j]$ is computed S10. A dense, floating-point vector y is accordingly obtained S18. That is, results of operations performed at S10 are stored in y. Because such operations are performed for each word of V, the dimension of vector y is determined by the dimension |V| of the vocabulary V. That is, the number of entries in y corresponds to |V|.

The second phase comprises computing S20 (again for said each histogram $X_2[j] \in X_2$) a multiplication S24 between a matrix-representation of the set $X_1$ of histograms and the vector y. This multiplication is thus a sparse-matrix, dense-vector multiplication. It is carried out S24 as a matrix-vector product. That is, multiple dot products are performed, i.e., one dot product between each $X_1[i]$ and y. The vector y as used during the second phase is the vector as computed during the first phase for that same histogram $X_2[j]$. Because the multiplication (matrix-vector product) performed at step S24 involves a matrix-representation of $X_1$, it allows distances between all histograms $X_1[i]$, $i \in \{1, \ldots, N_1\}$ of the set $X_1$ and said each histogram $X_2[j]$ to be obtained (S26), in one operation. Note that one may rely on CPU/GPU implementations of the so-called BLAS library to perform the matrix multiplication operations, so as to compute dot-products in parallel on the available compute resources (using several processing cores and/or vector units as available on a CPU/GPU).

Repeating the two-phase process S10, S20 for each histogram $X_2[j]$, distances between all pairs $(X_1[i], X_2[j])$ of histograms can eventually be obtained, $\lor\ i \in \{1, \ldots, N_1\} \land \forall\ j \in \{1, \ldots, N_2\}$. Finally, distances between pairs of documents 1 can subsequently be assessed S30, S40, based on the pairs of distances obtained, e.g., for ingesting, storing and searching across an amount of textual information.

A main advantage of the above scheme is that the relatively high cost of the first phase is amortized when considering a large set (e.g., millions) of histograms $X_1[l] \in X_1$, owing to the simple multiplication (matrix-vector product) involved in the second phase. As discussed later in detail, each of the two phases S10, S20 can in fact be implemented so as to have low (e.g., linear) complexity in terms of sizes of the sets $X_k$ and sizes of the histograms $X_k[l]$.

As a result, the present approach eventually allows the complexity to be reduced (with respect to implementations of the WMD and RWMD methods), while essentially preserving the accuracy of the prior WMD and RWMD theories. Embodiments even allow a linear-complexity implementation (in terms of average sizes of histograms) to be achieved, which can thus be regarded as a linear-complexity implementation of the RWMD method.

Figure 6:
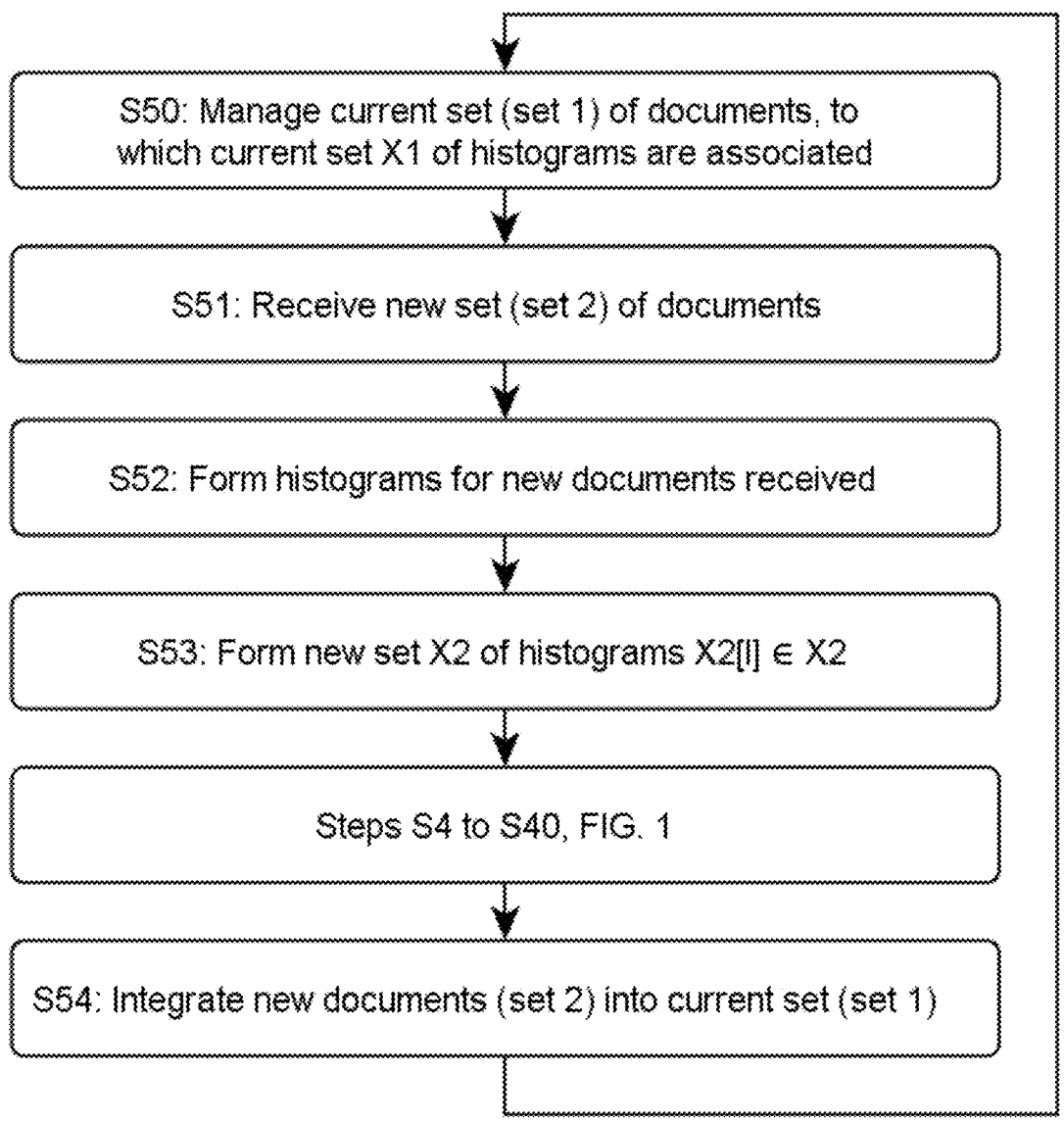
FIG. 6 is another flowchart, which illustrates high-level steps of methods for managing sets of documents, according to embodiments.

More generally, the new methods disclosed herein allow the average time complexity to be reduced, which, in practice, renders high-quality search results offered by WMD and RWMD applicable to massive datasets. In that respect, another aspect of the invention concerns a method of managing sets of documents, which is illustrated in the flowchart of FIG. 6. This method assumes a scenario in which, given a set $X_1$ of histograms of words, where $X_1$ corresponds to a first set of documents as currently stored S50 in a pool of documents, a new set (i.e., a second set) of documents is received S51. A corresponding set $X_2$ of histograms of words is created S52, S53 for the second set of documents. Here again, histograms of $X_2$ pertain, each, to a respective document of the new set of documents received S51. Then, distances between pairs of documents of $X_1$ and $X_2$ are assessed, according to the method discussed above. One may for instance rely on steps S4-S40 of FIG. 1. Yet, the methods illustrated in FIGS. 2 and 3 may also be used, as described later. In practice, the new set of documents is typically stored S54 (e.g., integrated) in the existing pool of documents after having assessed S40 distances between pairs of documents of the two sets. A more efficient management (e.g., be it in terms of storage, integration, queries, etc.) will, in general, indeed be achieved if the new set is stored after analysis S4-S40.

Moreover, embodiments of the present methods are very suitable for parallelization, owing to the fact that the two-phase process S10, S20 is performed for each histogram $X_2[j]$. In particular, the present methods are generally found to suitably map onto graphics processing units (GPUs) and can thus be efficiently distributed across a cluster of GPUs. In that respect, experiments conducted by the Inventor on real-life datasets have notably demonstrated: (i) up to two orders of magnitude performance improvement with respect to a multi-GPU implementation of the quadratic RWMD, as designed by the Inventor; and (ii) up to five-to-seven orders of magnitude performance improvement with respect to a single-threaded CPU implementation of WMD that uses RWMD for pruning.

Interestingly, the present methods not only reduce the computational complexity, but also make it possible to reduce storage requirements with respect to a quadratic complexity implementation of the known RWMD method. In fact, because embodiments disclosed herein happen to map well onto linear algebra primitives as supported by modern GPU programming infrastructures, they effectively require a limited amount of working memory. Thus, they are very suitable for hardware acceleration. Reducing the time complexity of RWMD (e.g., from quadratic to linear) further makes it possible to compute painwise distances across: (i) large sets of documents (e.g., millions of documents); and (ii) large histograms (e.g., millions of entries in histograms).

For instance, the present methods can very advantageously be applied where one or each of the two sets $X_2$ and $X_1$ exceeds ~1 000 000 histograms. Note, however, that embodiments of the present methods already show net advantages, e.g., in terms of time complexity, for lower numbers of histograms. For example, it can be shown that embodiments (such as discussed in sect. 2) are slightly faster than the quadratic RWMD method and, this, even if the two sets comprise, each ~10 000 histograms only. Incidentally yet, it is noted that the vocabulary size also plays a role. I.e., the size of V impacts, in practice, the number of histograms needed.

In addition, the present methods make it possible to use histograms having very large numbers of words. Namely, tractable computations can here be contemplated, even if one or more of the histograms of any or each of the sets $X_2$ and $X_1$ comprises ~1 000 000 distinct words, or more. Even more so, tractable computations can still be achieved, within the present approach, if each of $X_2$ and $X_1$ comprises millions histograms, while one or more of these histograms comprise millions of distinct words.

However, embodiments such as illustrated in FIGS. 1, 2 and discussed in sect. 2 may happen to be slightly slower when smaller numbers of histograms are involved. Still, variants to such embodiments will later be discussed, in reference to FIG. 3, to address this issue.

Preferred embodiments are now discussed in detail. To start with, Euclidean distances are preferably relied on, consistently with former WMD and RWMD approaches. In particular, the distance computed at step S10 (between each word in V and the closest entry in a current histogram $X_2[j]$) is preferably a Euclidean distance. As a result, Euclidean distances are implied during the second phase too, where the sparse-matrix, dense-vector multiplication is computed. Still, other metrics can be contemplated. However, distance metrics are generally preferred over similarity metrics, because methods such as EMD and WMD normally require to use a distance metric rather than a similarity metric. E.g., a cosine similarity will typically not convene in the present case. Yet, complexities (computational costs) of the cosine similarity and Euclidean distance are essentially the same (it is determined by a matrix multiplication operation). In fact, if the word vectors are L2-normalized, the cosine similarity can be translated into Euclidean distance using a simple formula.

Figure 4B:
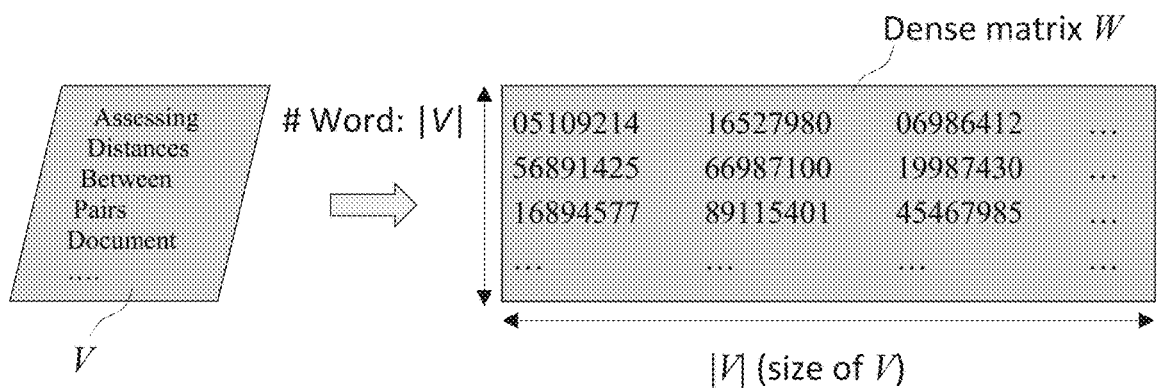

As illustrated in FIGS. 1-3, during the first phase S10, the vector y is preferably computed S18 based. S9, S14 on two dense matrices. The first one, W, stores vector representations of words in the vocabulary V. The second one, $T_2[j]$, stores vector representations of words of the current histogram $X_2[j]$, as depicted in FIGS. 4A, 4B. Using dense matrices W and $T_2[j]$ as defined above makes it possible to more easily compute distances between words in V and the closest entry in $X_2[j]$, as exemplified below.

Figure 5A:
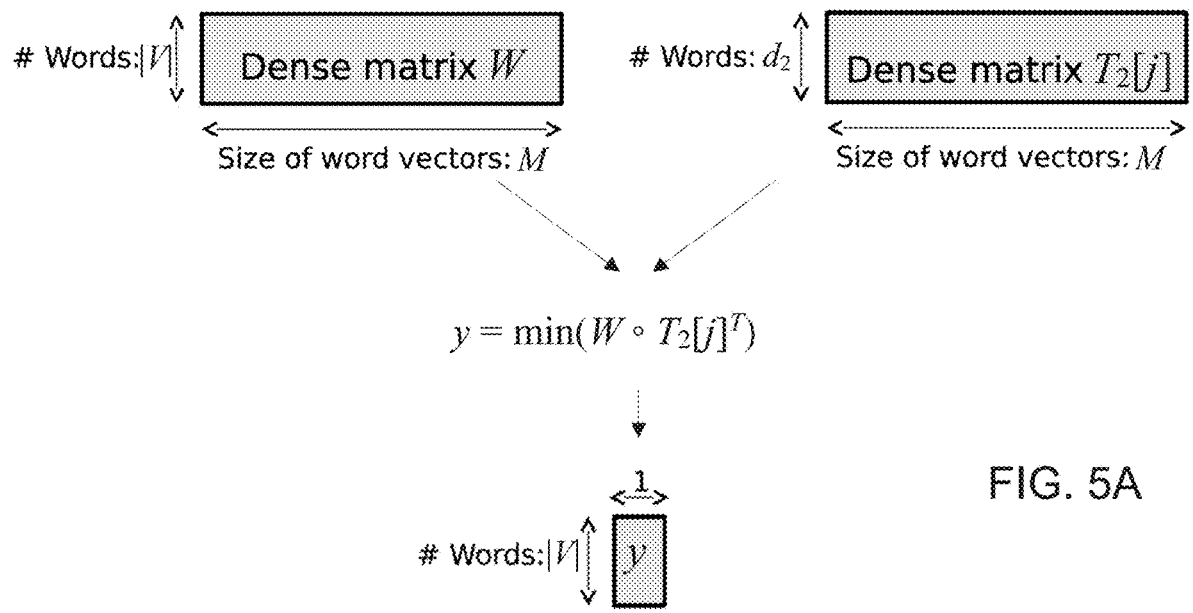
Figure 5B:
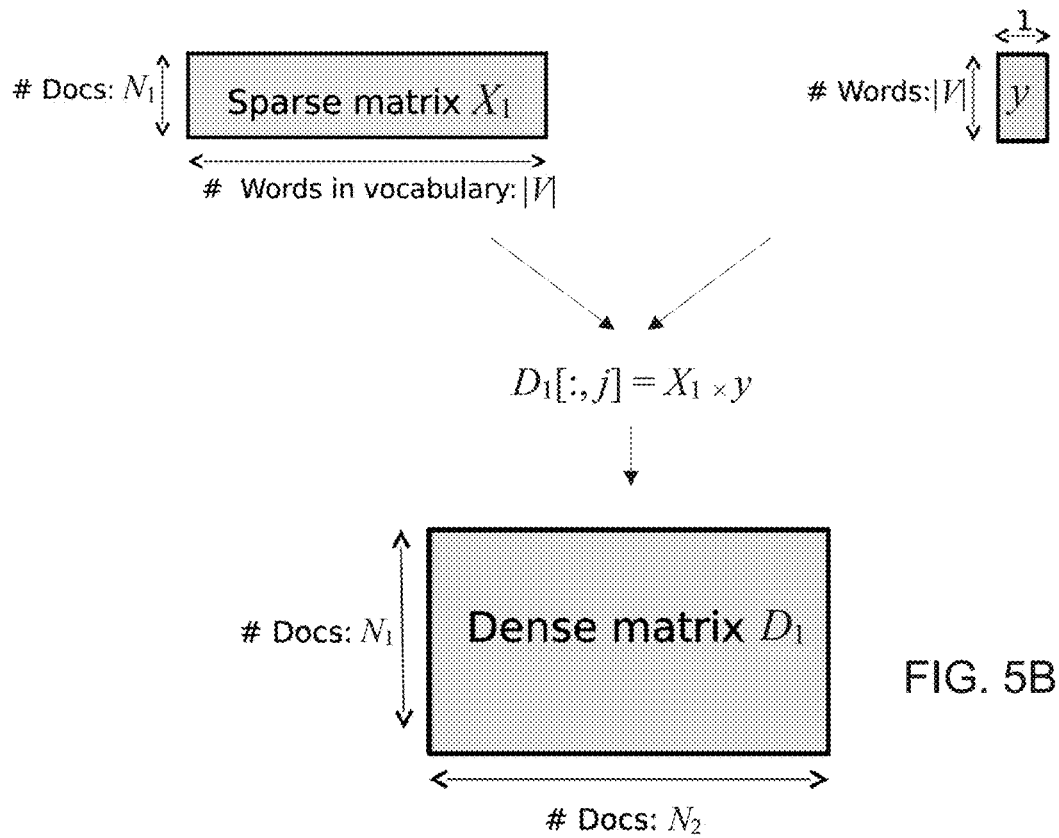

Different approaches can be contemplated for the operation performed at step S18. What perhaps is the most efficient, is to perform S18 this operation as a modified matrix multiplication operation. Namely, the vector y may be computed S18 as $\min(W \circ T_2[j]^T)$, where $\circ$ is a modified matrix multiplication operation, as depicted in FIG. 5A. In this specific operation, distances are computed between word vectors of W and $T_2[j]^T$ instead of computing mere dot products between W and $T_2[j]^T$, as one would expect in a classic matrix multiplication operation. In addition, here, row-wise minimums of $W \circ T_2[j]^T$ are computed to obtain $\min(W \circ T_2[j]^T)$. This makes it possible to derive minimal distances between words in the vocabulary V and words in $X_2[j]$, which provides a practice scheme to identify a distance between each word in V and the closest entry in $X_2[j]$. Eventually, such minimal distances are stored. S18 in the vector y, for the current iteration on $X_2[j]$, it being reminded that such iterations can be parallelized, as noted earlier.

The modified matrix multiplication operation described above makes it possible to markedly reduce the complexity of the first phase. I.e., the complexity of this phase is determined by the $\circ$ operation and is given by $O(|V| d_2 M)$, as re-discussed later in detail. Although the $\circ$ operation does not specifically contribute to reduce the complexity, the result of this operation can be directly re-used for all $X_1[i]$ in the second phase, which, as a whole, lowers the complexity of the process.

As further illustrated in FIGS. 1-3, the dense matrix W may store vectors of floating point numbers, as obtained using any suitable word embedding process S5 (e.g., Word2Vec), so that words from the vocabulary can be mapped onto vectors of real numbers. In detail, for each word $w \in \{1, \ldots, |V|\}$ in the vocabulary V, the corresponding row W[w] of the matrix W may store a vector of M floating point numbers, as obtained via the word embedding process. This way, each word w can be mapped onto a vector of real numbers.

The modified matrix multiplication operation ○ performed at step S18 may, in practice, be performed as follows. First, a norm of each row of W and each row of $T_2[j]$ is computed. Then, W can be multiplied by the transpose of $T_2[j]$, in order to compute distances between each row of W and each row of $T_2[j]$. Again, Euclidean distances are typically meant. I.e., the Euclidean distance between word vectors W[u] and W[v] is given by $\|W[u]-W[v]\|_2$ and can be calculated as follows, where $\| \|_2$ is the Euclidean norm and $^T$ denotes a transpose:

$$\|W[u]W[v]\|_2 = (\|W[u]\|_2^2 + \|W[v]\|_2^2 - 2\|W[u]\|\|W[v]\|^T)^{1/2}.$$

This operation and its implications are described in more detail in sect. 2.

Various optimizations can be contemplated. First, the vocabulary V may be processed (see step S4, FIGS. 1-3), prior to starting the first phase S10, so as for it to comprise a set of unique words as used in the union of the two sets $X_2$ and $X_1$ of histograms. This way, the number of operations required during the first phase S10 can be markedly reduced, it being noted that the average number of unique words per document (excluding stop-words) determine the average histogram size (noted d).

As one may realize, one may further reduce the size of the vocabulary V by removing S6 words from the vocabulary V that do not appear in the set $X_1$ of histograms, as such words are indeed not needed to determine the distances between words in V and the closest entry in histogram $X_2[j]$. This further lower the number of operations needed at step S10.

As made explicit in FIGS. 1-3, each of the first and second phases S10, S20 involves operations performed for each histogram $X_2[j]$, such that that both phases S10, S20 are equally suitable for parallelization. More precisely, the distance computation of step S18 and the sparse-matrix, dense-vector multiplication of step S24 can altogether be performed independently for each histogram $X_2[j] \in X_2$. Accordingly, while operations involved in phases S10, S20 are preferably executed consecutively, the two-phase operations S10, S20 can be computed in parallel, across all histograms $X_2[j] \in X_2$. In addition, because the present approach further allows a direct comparison against all $X_1[i] \in X_1$, the complexity of the computation can further be reduced, even with respect to a quadratic implementation of the RWMD method, see sect. 2.

This, as illustrated in sect. 2, eventually yields much faster computations. In particular, and as noted earlier, the two-phase process S10, S20 can be implemented using linear algebra primitives of general-purpose computing on GPUs. Their execution can thus advantageously be distributed across a cluster of GPUs. All this is explained in detail and illustrated by concrete results, in sect. 2.

By the end of the second phase S20, all distances relating to each current $X_2[j]$ are stored in a data structure, which is noted $D_1[:, j]$ as it may be regarded as the $j^{th}$ column of a corresponding matrix $D_1$. Note, however, that the matrix $D_1$ is much preferably computed column-by-column (i.e., one column at a time, or each column in parallel) and the notation "$D_1[:, j]$" as used herein does not imply that the matrix $D_1$ be computed as a whole. Yet, the final results, as obtained after completing the loop (or parallel computations) on each $X_2[j]$, may possibly be stored as an $N_1 \times N_2$ matrix $D_1$, step S30, for subsequent use, e.g., for managing document sets, S40.

The complexity of the procedure of FIG. 1 is now described in detail. To start with, it can be verified that the time duration complexity of the method of steps S12-S26 as shown in FIG. 1 is $O(N_2|V|d_2 M + N_1 N_2 d_1)$. Here, $N_1$ and $N_2$ respectively correspond to the numbers of histograms of the two sets $X_1$ and $X_2$, while $d_1$ and $d_2$ are the respective, average dimensions of histograms of the two sets. As noted earlier, $|V|$ is the dimension of the vocabulary V and M is the number of floating point numbers stored in each row W[w] of the dense matrix W, the latter obtained by a word embedding process. In comparison, the time complexity of RWMD is $O(N_1 N_2 d_1 d_2 M)$, meaning that the improvement is on the order of $O(\min(N_1 d_1/|V|, d_2 M))$.

As mentioned earlier, the storage space requirements too can benefit from the present methods. This is in particular true for the method of steps S12-S26 shown in FIG. 1, whose storage space complexity is $O(N_1 d_1 + |V|M)$. In comparison, the complexity of a quadratic implementation of the RWMD method is $O(N_1 d_1 M)$, meaning that an improvement of $O(\min(N_1 d_1/|V|, M))$ can be achieved.

As it can be realized, the ratio $N_1 d_1/|V|$ may likely be interpreted as indicating the extent in which an improvement can be achieved with respect to the classic RWMD. Thus, the methods described so far will advantageously be implemented where such a ratio is larger than (or equal to) 1. In practice, and as mentioned earlier, this typically is the case when relatively large numbers of histograms are involved (e.g., more than ~10 000, on average, per set $X_k$).

The algorithm described so far merely relates to computing the costs of moving histograms $X_1[i]$, $i \in \{1 \ldots N_1\}$ to histograms $X_2[j]$, $j \in \{1 \ldots N_2\}$, as illustrated in the flowchart of FIG. 1. Yet, as one may realize, a tighter lower bound could be achieved by further computing the costs of moving histograms $X_2[j]$, $j \in \{1 \ldots N_2\}$ to $X_1[i]$, $i \in \{1 \ldots N_1\}$, as explained now in reference to FIG. 2. In this variant, the steps performed along the left-hand side branch of FIG. 2 are identical to that of the right-hand side branch, which are themselves identical to those of FIG. 1. The only differences are that $X_1$ and $X_2$ are swapped and the new round of computations are now run for each $X_1[i]$. This additional process gives rise to corresponding steps S9a-S26a (LHS branch of FIG. 2), which are otherwise identical to steps S9-S26 (RHS branch of FIG. 2, FIG. 1). Since the LHS algorithm of FIG. 2 is run for each $X_1[i]$, the operations performed in the two-phase process S10a, S20a may once more be run in parallel. Practically, the additional process S10a, S20a may typically be performed after having performed the two-phase process S10, S20, especially if massive sets of documents are involved.

This eventually yield an $N_2 \times N_1$ matrix $D_2$, step S30a. A final distance matrix D can be obtained, step S33, by computing the maximum values of the symmetric entries in $D_1$ and $D_2$ (i.e., $D = \max(D_1, D_2^T)$). This way, a tight lower bound to WMD can be obtained, it being reminded that RWMD is a lower bound of WMD. Yet, the maximum of $D_1$, $D_2^T$ may be used to produce an even tighter lower bound.

Note that each of the branches S9-S26 and S9a-S26a may benefit from similar optimizations as already described earlier. First, the vocabulary taken into account for each distance computation steps S10, S20, S10a, S20a may be obtained S4 from an initial vocabulary $V_0$ that comprises a set of unique words used in the union of the sets $X_2$ and $X_1$. Second, after the word embedding process S5, the vocabularies used in each branch shall preferably differ, so s to be optimized for each concurrent process. Namely, while the vocabulary $V_1$ taken into account for the RHS branch may be reduced S6 by removing words that do not appear in $X_1$, the vocabulary $V_2$ used in the LHS branch may conversely be reduced S6a by removing words that do not appear in $X_2$, for the same reasons as mentioned previously.

Again, each of the two-phase processes (i.e., of each branch) is preferably executed in parallel, i.e., for each histogram $X_2[j]$ when computing pairs of steps (S10, S20) and for each histogram $X_1[i]$ when computing pairs of steps (S10a, S20a). As noted earlier, this is preferably achieved using linear algebra primitives of GPUs, so as for execution of each branch to be distributed across a cluster of GPUs.

The complexity of the algorithm described in FIG. 2 can easily be inferred from earlier considerations. This algorithm too shows benefits when large numbers of histograms are involved. Yet, it necessarily has the same drawbacks as the algorithm of FIG. 1 when smaller numbers of histograms are involved (e.g., less than ~10 000, on average, per set $X_k$). Thus, another class of embodiments are now discussed, in reference to FIG. 3, which address a case where one of the sets is large compared to the other.

Basically, such embodiments involve a quadratic-complexity RWMD process, applied subsequently to core steps of a method such as described in FIG. 1. Yet, the additional RWMD process is applied to compute the cost of moving histograms $X_2[j]$ of the second set into a reduced version of $X_1$, so as to maintain a low complexity.

The description of the following procedure assumes that, given two sets $X_1$, $X_2$, of histograms, $X_1$ is the largest set. As seen in FIG. 3, steps S1-S26 are identical to steps S1-S26 of FIG. 1. At step S26, the distances resulting from the two-phase process S10, S20 are stored, for each j, in a first data structure, which is representable as a vector $D_1[:, j]$. The latter corresponds to the $j^{th}$ column of the matrix $D_1$, computed column-by-column, as described earlier. This, incidentally, makes it here again possible to parallelize the process of FIG. 3. The dimension of $D_1[:, j]$ is equal to $N_1$, i.e., each entry in $D_1[:, j]$ is associated with a histogram of the set $X_1$.

Next, $D_1[:, j]$ is sorted S28 in ascending order of the distances stored thereon. That is, the first (or top) entry (or element) of $D_1[:, j]$ corresponds to the smallest distance stored in $D_1[:, j]$. Then, the sorted vector is cropped S30b, such that a first, cropped data structure $D^c_1[:, j]$ is obtained, wherein only the K first entries of the previously sorted vector are retained. The K first entries retained correspond to the K smallest distances of the sorted vector. Following this, a reduced set $X^c_1$ of histograms associated with $D^c_1[:, j]$ is identified S31b. This can be achieved based on the histogram indices corresponding to the distances stored on $D^c_1[:, j]$. Thus, the reduced set $X^c_1$ corresponds to a reduced version of $X_1$ (i.e., it comprises a smallest portion of the initial histograms of $X_1$).

Now, a quadratic-complexity RWMD process is implemented S32b, so as to compute a cost of moving the $j^{th}$ histogram $X_2[j]$ of $X_2$ into the reduced set $X^c_1$ of histograms. This gives rise to a second data structure $D^c_2[:, j]$. Finally, the quantity $D^c[:, j] = \max(D^c_1[:, j], D^c_2[:, j])$ is computed S33b. This quantity is a variant to the matrix D obtained at step S33 of FIG. 2, which can advantageously serve as a basis for subsequent management steps S40, wherein distances between pairs of documents need be assessed.

As the above variants applies the RWMD method to a reduced set $X^c_1$ of histograms, it typically provides improved execution performance, compared with the bare (quadratic) RWMD process. For example, execution performance can typically be improved by two order of magnitudes when keeping the top 1% histograms of $X_1$.

As apparent from FIG. 3, this variant does not compute the full matrix D, contrary to the algorithm of FIG. 2. Instead, it computes an approximate version of the so-called R matrix directly, see sect. 2, using one column of $D_1$ at a time. Because of the reduced set $X^c_1$ considered, some accuracy might be lost in the process. To mitigate this, one may increase the number of entries retained in $D^c_1[:, j]$. However, in practice, if the larger set $X_1$ has, e.g., millions of histograms, keeping the top 1-2% distances happens to produce near-optimal results. When $X_1$ is smaller (e.g., around 10 000 histograms), there one may need to consider a higher percentage (e.g., up to 10%). This, however, impacts the residual improvement. However, a substantial improvement can still be obtained (e.g., increasing the percentage of kept histograms of $X_1$ to 10% still allows the execution time to be improved by one order of magnitude).

Figure 7:
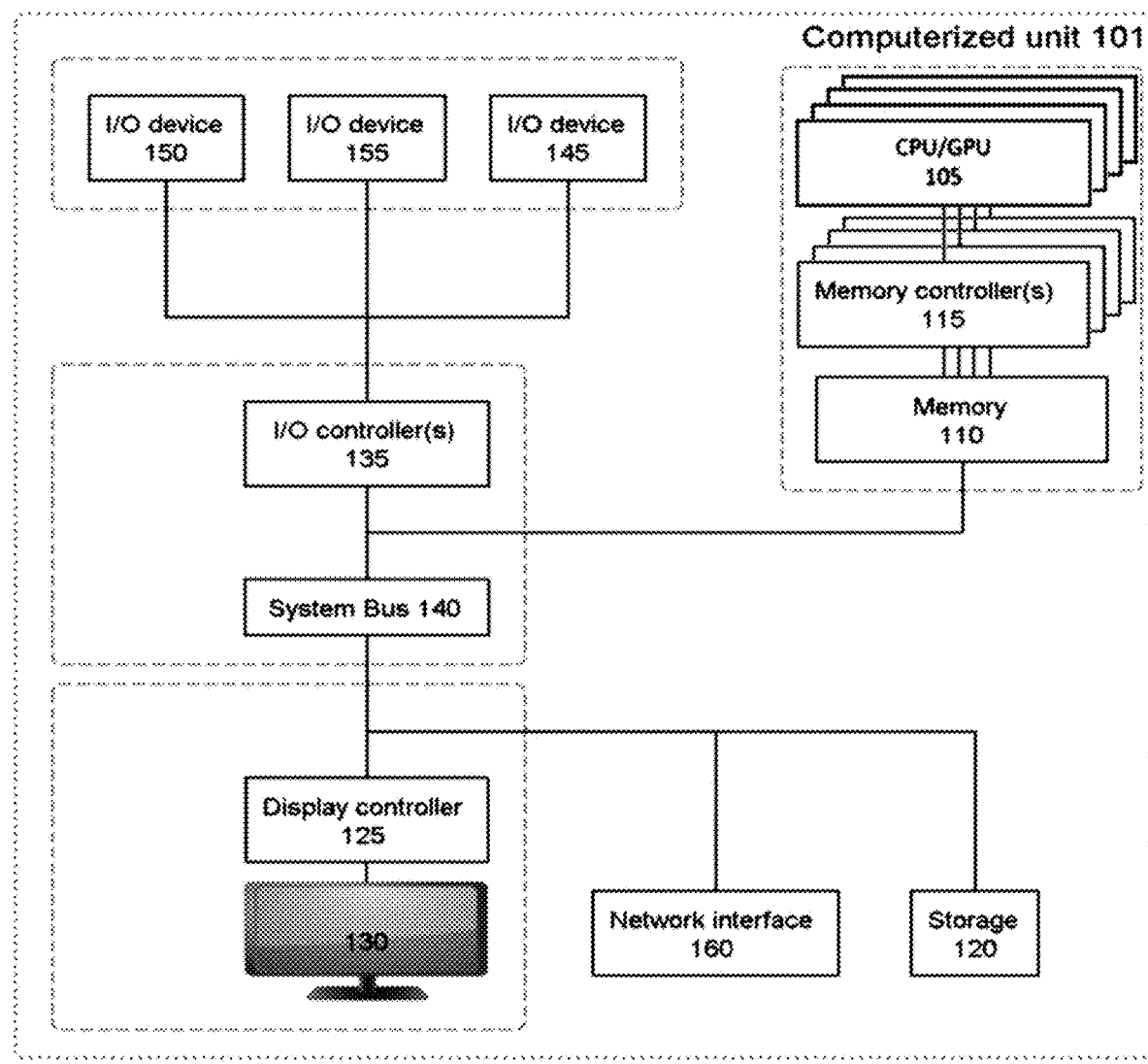
FIG. 7 schematically represents a computerized system, suitable for parallelizing steps performed in the present methods, as involved in embodiments of the invention.

FIG. 7 depicts a general computerized unit 101, which can advantageously be used to implement the present methods. Such a unit 101 notably comprises CPUs and/or GPUs configured for enabling parallelization of computerized steps (e.g., two-phase process S10, S20 and/or S10a, S20a) as involved in embodiments. Yet, the present methods may also involve virtual machines, e.g., in the cloud, dedicated to the large computations. Additional detail are discussed in sect. 3.

Finally, the present invention may also be embodied as a computer program product. This program may for instance be run (at least partly) on a computerized unit 101 such as depicted in FIG. 7. This computer program product comprises a computer readable storage medium having program instructions embodied therewith, which program instructions are executable by a processing unit (e.g., such as units 105 in FIG. 7), to cause the latter to take steps according to the present methods. Aspects of the present computer programs are discussed in detail in sect. 3.1 and 3.2.

The above embodiments have been succinctly described in reference to the accompanying drawings and may accommodate a number of variants. Several combinations of the above features may be contemplated. Examples are given in the next section.

a. Detailed Description of Specific Embodiments

The purpose of this section is to provide a detailed description of a new algorithm for computing the Relaxed Word Mover's Distance which reduces the average time complexity from quadratic to linear. In practice, the achieved reduction in complexity makes the high quality search results offered by WMD and RWMD applicable for massive datasets. Additional aspects discussed in this section relate to:

Massively parallel GPU implementations and scalable distributed implementations targeting clusters of GPUs;

Formal complexity analysis, practical scalability evaluation, and comparisons with alternative methods;

Applications of the LC-RWND algorithm for k-nearest neighbors search and classification-based tasks;

Extensive comparisons of prevalent text similarity measures with respect to both runtime and search quality.

The known WMD and RWMD approaches are discussed in detail in the next section. The detailed discussion and present considerations of the WMD and RWMD approaches that follow includes interpretations, comments, conclusions and implementations that originate from the present Inventors and were not included in the original papers. Thus, aspects of these discussion and considerations may not be considered as prior art for the present document.

2.1. Practical Implementations of the WMD and RWMD Methods 2.1.1 General Concepts The Word. Mover's Distance assesses the semantic distance between two documents. So, if two documents discuss the same topic they will be assigned a low distance, even if they have no words in common. WMD consists of two components. The first is a vector representation of the words. The second is a distance measure to quantify the affinity between a pair histograms, which in essence represent a so-called bag of words representation of each document in the new vector space. The vector representation creates an embedding space, in which semantically synonymous words will be close to each other. This is achieved using word2vec which maps words in a vector space using a neural network. In fact, word2vec uses the weight matrix of the hidden layer of linear neurons as the vector representation of the words from a given vocabulary. The distance between two documents is calculated as the minimum cumulative distance of the words from the first document to the words of the second document. This optimization problem is well studied in transportation theory and is called the Earth-Mover's Distance (EMD). Each document is represented as histogram of words and each word as a multi-dimensional vector. E.g., under word2vec each word may be represented as a 300-dimensional vector.

Given two high-dimensional histograms P and Q, EMD attempts to discover the flow that minimizes the overall cost:

$$EMD(P, Q) = \min \sum_{i,j} f_{ij} d_{ij} / \sum_{i,j} f_{ij} \text{ s.t. } f_{ij} \geq 0$$

$$\sum_j f_{ij} \leq P_i$$

$$\sum_i f_{ij} \leq Q_j$$

$$\sum_j f_{ij} \min\left(\sum_i P_i, \sum_j Q_j\right),$$

where $f_{ij}$ represents the flow, i.e., how much of the word i in P has to flow to the word j in Q. EMD also has a probabilistic interpretation and is conceptually equivalent to the so-called Mallows distance on probability distributions [4].

When P and Q are L1-normalized, the formulation of the EMD can be simplified as follows:

$$EMD(P, Q) = \min \sum_{i,j} f_{ij} d_{ij} \text{ s.t. } f_{ij} \geq 0$$

$$\sum_j f_{ij} \leq P_i$$

$$\sum_i f_{ij} \leq Q_j$$

Such a simplification is possible because L1-normalization ensures the following:

$$\sum_i P_i = 1$$

-continued $$\sum_j Q_j = 1$$

$$\sum_{i,j} f_{ij} = 1$$

In the remainder of this text, we assume that histograms are L1-normalized (e.g., by using a preprocessing step), which enables us to use the simplified formulation of the EMD problem.

The combination of word embeddings and ENID forms the core of the WMD distance measure. In [2], WMD has been shown to outperform seven state-of-art baselines in terms of the k-Nearest-Neighbor classification error across several text corpora. This is because WMD can capture linguistic similarities of semantic and syntactic nature and learns how different writers may express the same viewpoint or topic, irrespective of whether they use same words or not.

2.1.2 Complexity of WMD and RWMD Methods

Assume we are given two sets of histograms $X_1$ and $X_2$, and a vocabulary of size V. The sets $X_1$ and $X_2$ can be seen as sparse matrices, wherein each row is a sparse vector of dimension V. Each row X[i] represents a histogram that is extracted from a text document and stores the weights (e.g., term frequencies) of the unique words in that document. The popular compressed sparse rows (csr) representation is a convenient way of storing the sparse matrices $X_1$ and $X_2$.

Assume that the sparse matrix $X_1$ has $N_1$ rows and the sparse matrix $X_2$ has $N_2$ rows, and that we are further given a dense matrix W, which stores the vector representations of the words that belong to the vocabulary V. Basically, for each word $w \in \{1 \ldots |V|\}$ in the vocabulary V, W[w] stores a vector of M floating point numbers given by some suitable embedding process (e.g., Word2Vec in the case of WMD). Given $X_1$, $X_2$, and W, the goal is to compute the distance between each pair of histograms ($X_1[i]$, $X_2[j]$), $i \in \{1 \ldots N_1\}$, $j \in \{1 \ldots N_2\}$.

The results of WMD and RWMD can be stored in an $N_1 \times N_2$ matrix D. Given a histogram $X_2[j]$, the top-K closest histograms in $X_1$ may be computed, and their positions in $X_1$ as well as the respective distance values may be stored in an $N_2 \times K$ matrix R. The matrix D is typically computed one column or one row at a time, and the top-K results in each column or row are stored in the matrix R.

Given two histograms $X_1[i]$, $i \in \{1 \ldots N_1\}$, and $X_2[j]$, $j \in \{1 \ldots N_2\}$, the first step of WMD is to gather the vector representations of the words in $X_1[i]$ and $X_2[j]$ from the matrix W. Assume that the number of nonzeros in $X_1[i]$ is $d_1$ and the number of nonzeros in $X_2[j]$ is $d_2$. The dense matrix $T_1[i]$ stores the vector representations of the words in $X_1[i]$ and has $d_1$ rows and M columns. Similarly, the dense matrix $T_2[j]$ stores the vector representations of the words in $X_2[j]$ and has $d_2$ rows and M columns.

Once $T_1[i]$ and $T_2[j]$ are constructed, Euclidean distances between all pairs of word vectors are computed. As indicated in sect. 1, the Euclidean distance between word vectors W[u]

and $W[v]$ is given by $\|W[u] \ldots W[v]\|_2$, and can be calculated as follows, where $\|\|_2$ is the Euclidean norm and $^T$ denotes a transpose:

$$\|W[u]-W[v]\|_2 = (\|W[u]\|_2^2 + \|W[v]\|_2^2 - 2\|W[u]\|\|W[v]\|^T)^{1/2} \quad (1)$$

Table I below aggregates notations as used herein.

TABLE I

Data structures used in WMD-related computations

| Term | Type | Description |
|---|---|---|
| W | Input | Word vectors for the vocabulary |
| X | Input | A set of histograms (e.g., csr matrix) |
| T[i] | Auxiliary | Word vectors for histogram i |
| F[i] | Auxiliary | Word frequencies in histogram i |
| D | Output | Distance matrix |
| R | Output | Top-K results |

As it can be realized, the Euclidean distances between all pairs of word vectors in $T_1[i]$ and $T_2[j]$ form a $d_1 \times d_2$ dense matrix denoted as $T_1[i] \circ T_2[j]^T$. Here, the operation is similar to a matrix multiplication operation, but instead of computing dot products, Euclidean distances are computed between the word vectors.

In practice, $T_1[i] \circ T_2[j]^T$ can be computed by:
a. Calculating the Euclidean norm of each row of $T_1[i]$;
b. Calculating the Euclidean norm of each row of $T_2[i]$;
c. Multiplying $T_1[i]$ by the transpose of $T_2[j]$; and
d. Applying Eq. (1) above 1 independently between each row of $T_1[i]$ and each row of $T_2[j]$.

One may verify that the complexity of the $\circ$ operation across two matrices, each with O(d) rows and O(M) columns is determined by the matrix multiplication operation and is given by $O(d^2M)$.

Solving the WIND problem: Suppose that for each $X_1[i]$, $i \in \{1 \ldots N_1\}$, a dense representation $F_1[i]$, $i \in \{1 \ldots N_1\}$ is constructed. In other words, if the number of nonzeros in $X_1[i]$ is $d_1$, the size of $F_1[i]$ is also $d_1$. Similarly, for each $X_2[j]$, $j \in \{1 \ldots N_2\}$, a dense representation $F_2[j]$, $i \in \{1 \ldots N_2\}$ is constructed. If the number of nonzeros in $X_2[j]$ is $d_2$, then the size of $F_2[j]$ is $d_2$. EMD is computed based on $F_1[i]$, $F_2[j]$, and $T_1[i] \circ T_2[j]^T$ (see FIG. 5). The notation introduced so far is summarized in Table I (above) and Table II (below).

TABLE II

Parameters used in WMD-related computations

| Parameter | Description |
|---|---|
| N | Average number of histograms V |
| \|V\| | Size of the vocabulary |
| M | Size of the word vectors |
| d | Size of a histogram |
| K | Used in top-K calculation |

EMD constructs a bipartite graph: one side of the graph has $d_1$ nodes and the other side $d_2$ nodes. There are in total $d_1 \times d_2$ edges. The weights of the nodes of the bi-partite graph are given by $F_1[i]$ and $F_2[j]$, respectively. The costs associated with the edges are given by $T_1[i] \circ T_2[j]^T$, that is, the Euclidean distance from one vector to the other. EMD solves a minimum cost flow problem on the resulting graph.

Assuming that the size of $F_1[i]$ and $F_2[j]$ is O(d), the complexity of EMD computation is $O(d^3 \log(d))$. Then, the overall complexity of WMD computation between two pairs of histograms is $O(d^2M + d^3 \log(d))$. If $N_1$ and $N_2$ are both O(N), the complexity of computing WMD across all pairs of histograms is $O(N^2d^2M + N^2d^3 \log(d))$. So, the complexity of WMD grows quadratically in N (the number of documents), and cubically in d (the average size of histograms).

Solving the RWMD problem: The RWMD provides a lower-bound approximation of the WMD. Similar to WMD, the first step of RWMD is the computation of $T_1[i] \circ T_2[j]^T$. Because $T_1[i]$ has $d_1$ rows and $T_2[j]$ has $d_2$ rows, $T_1[i] \circ T_2[j]^T$ is a matrix off dimensions $d_1 \times d_2$. The second step of RWMD is the computation of the minimum value of each raw of $T_1[i] \circ T_2[j]^T$, which produces a floating-point vector of dimension $d_1$. The third and the final step of RWMD is a dot-product operation between $F_1[i]$ and the result of the second step, which produces a single floating-point value.

Because the RWMD computation is not symmetric, it is of advantage to perform it twice and swap $T_1[i]$ with $T_2[j]^T$ and $F_1[j]$ with $F_2[j]^T$ when repeating the process. The symmetric lower-bound is not necessarily equal to the first lower-bound and computation of the maximum of these two bounds provides an even tighter lower bound for WMD. In practice, it may be realized that it is not necessary to compute $T_2[j] \circ T_1[i]^T$ explicitly because this matrix is the transpose of $T_1[i] \circ T_2[j]^T$. It is sufficient to compute the minimum value in each column of $T_1[i] \circ T_2[j]^T$, and multiply the result by $F_2[j]^T$ to produce the symmetric lower-bound approximation.

Finally, the complexity of the overall RWMD computation is determined by the complexity of computing $T_1[i] \circ T_2[j]^T$, which is $O(d^2M)$. When computed across two sets of size O(N) each, the overall complexity is $O(N^2d^2M)$, which is significantly lower than the complexity of WMD. However the complexity of RWMD still grows quadratically with both N and d, which can be prohibitive when N and d are large.

Speeding-up WMD using pruning: A pruning technique was given in [2] to speed-up the WMD computation, which uses the property that RWMD is a tight lower bound for WMD. Given a histogram $X_2[i]$, first RWMD is computed between $X_2[i]$ and all histograms in $X_1$. Given a user-defined parameter K, the top-K closest histograms in $X_1$ are identified based on the RWMD distances. After that, WMD is computed between X2[i] and the top-K closest histograms in $X_1$. The highest WMD value computed by this step provides a cut-off value C. WMD is computed between $X_2[i]$ and the remaining histograms in $X_1$ only if the pairwise RWMD value is lower than C. All other histograms will be pruned because they cannot be part of the top-K results of WMD. Naturally, when K is small, C also becomes small, which leads to a more effective pruning.

Other methods: The so-called Word centroid distance (WCD) method provides another approximation of WMD, wherein a single vector, called the centroid, is computed for each histogram X[i] by simply multiplying X[i] and W, see ref. [2]. This operation, essentially, computes a weighted average of all the embedding vectors associated with the words that are in X[i]. The WCD between two histograms $X_1[i]$ and $X_2[j]$ is given by the Euclidean distance between the respective centroids. The complexity of computing all the centroids is then O(NdM) and the complexity of computing all the distances across two sets of size O(N) each is $O(N^2M)$. When N>>d, the overall complexity becomes $O(N^2M)$. Although WCD has much lower complexity than RWMD, it is known to be a very crude approximation and it is not regarded as a tight lower bound of WMD. Therefore, WCD is generally not suitable for applications that require a high accuracy.

Cosine similarity is a popular way of producing similarity scores across documents. Negating a similarity score is sufficient to transform it into a distance metric. Cosine similarity between to histograms $X_1[i]$ and $X_2[j]$ can be computed simply by a dot-product operation, which has complexity $O(d)$. The complexity of computing all pairwise similarity scores across two sets of size $O(N)$ each is then $O(N^2 d)$. Thus, cosine similarity has a much lower complexity than RWMD. However, it is neither a lower bound of WMD, nor it can take advantage of word embedding.

2.2. Linear-Complexity Implementation of the RWMD Method (According to Embodiments)

A main disadvantage of the quadratic RWMD method is that it computes the distances between the same pair of words multiple times. This overhead could be eliminated by precomputing the distances between all possible pairs of words in the vocabulary in advance. However, typical vocabulary sizes are in the order of a few million terms, which could, for instance, include company or person names in a business analytics setting. Storing distances across millions of terms requires tens of terabytes of storage space. In addition, accesses to this storage would be completely random, rendering software parallelization and hardware-acceleration impractical. Second, even if we assume that the distances across all words in the vocabulary are pre-computed and stored in a large and fast storage medium that enables parallel random accesses, if a given word w appears in histograms $X_1[i]$, $i \in \{1 \ldots N_1\}$ n times, the quadratic RWMD method computes the word closest to w (i.e., the minimum distance) in each of the histograms $X_2[j]$, $j \in \{1 \ldots N_2\}$ exactly n times. Such a redundancy, again leads to a quadratic time complexity.

Thus, a new method is proposed for computing RWMD, which addresses each of the above problems and reduces the average time complexity to linear. This approach not only reduces the computational complexity, but also reduces the storage requirements with respect to the quadratic RWMD. The new approach further maps well onto linear algebra primitives supported by modern GPU programming infrastructures, and requires a limited amount of working memory. Thus, it is very suitable for hardware acceleration. Reducing the time complexity of RWMD from quadratic to linear further makes it possible to compute pairwise distances across (i) large sets of documents (e.g., millions of documents) and (ii) large histograms (e.g., millions of entries in histograms).

The present Inventors has implemented this linear-complexity method and concludes that it is the only practical way of computing RWMD between all pairs across millions of documents, which leads to trillions of RWMD computations. Notably, he arrived at orders of magnitude performance improvements with respect to a concurrent implementation of the quadratic-complexity RWMD method of Kusner et al. [2]

As described in the previous section, a focal point of the present work is a novel decomposition of the RWMD computation into two phases, where each phase has reduced complexity in terms of the size of the histograms in $X_1$ and $X_2$. In the LC-RWMD implementation discussed herein, each phase exactly has linear complexity in terms of the size of the histograms.

That is, for a given histogram $X_2[j]$, $j \in \{1 \ldots N_2\}$, the first phase computes the Euclidean distance to the closest entry in histogram $X_2[j]$ for each word in the vocabulary, which produces y, a dense floating-point vector of dimension $|V|$ (see FIG. 3A). The second phase performs a sparse-matrix, dense-vector multiplication between $X_1$ and y, which produces the RWMD between all $X_1[i]$, $i \in \{1 \ldots N_1\}$ and $X_2[j]$, see FIG. 3B).

The first phase is similar to the quadratic-complexity RWMD implementation proposed above in that it treats the vocabulary V as a single histogram and computes pairwise Euclidean distances across all the words in the vocabulary and the words in a given histogram $X_2[j]$ by computing $W \circ T_2[j]^T$. Next, row-wise minimums are computed to derive the minimum-distances between the words in the vocabulary and the words in $X_2[j]$, and the results are stored in the vector y of size $|V|$. The complexity of this phase is determined by the $\circ$ operation and is given by $O(|V|dM)$.

In the second phase, $X_1$ is multiplied by y to compute the RWMD. This phase is essentially a sparse-matrix, dense vector multiplication operation. For each $X_1[i]$, $i \in \{1 \ldots N_1\}$, this phase gathers the minimum distances from y based on the positions of the words in $X_1[i]$ and then computes a dot-product with $F_1[i]$. Therefore, the overall functionality is equivalent to the quadratic-complexity RWMD given earlier. Note that the second phase may compute distances across all histograms in $X_1$ and a single histogram from $X_2$ in parallel, hence its time complexity, is $O(Nd)$. A main advantage of the present approach is that the relatively high cost of the first phase is amortized over a large number of histograms $X_1[i]$, $i \in \{1 \ldots N_1\}$ in the second phase.

The overall complexity of the linear complexity RWMD (hereafter LC-RWMD) algorithm when comparing a single histogram from $X_2$ against all histograms in $X_1$ is then $O(|V|dM+Nd)$. The overall complexity when comparing all histograms of $X_2$ against all histograms of $X_1$ is $O(N|V|dM+N^2d)$. When N and $|V|$ are of the same order of magnitude, the overall complexity becomes $O(N^2dM)$. Even though this complexity still grows quadratically with the number of histograms (i.e., N), it grows linearly with the average size of the histograms (i.e., d).

The LC-RWMD algorithm can be adapted to compare several histograms from $X_2$ with all the histograms in $X_1$. In this case, the first phase of LC-RWMD computes the word with the minimum distance in each histogram of $X_2$ for each word in the vocabulary. Assume that s histograms from $X_2$ are used in the comparison. The result of the first phase is then a matrix Y with $|V|$ rows and s columns. In the second phase, a sparse-matrix, dense-matrix multiplication is performed between $X_1$ and Y, which produces a distance matrix with $N_1$ rows and s columns.

The algorithm described so far computes the costs of moving histograms $X_1[i]$, $i \in \{1 \ldots N_1\}$ to histograms $X_2[j]$, $j \in \{1 \ldots N_2\}$, as otherwise illustrated in the flowchart of FIG. 1. Assume that these results are stored in an $N_1 \times N_2$ matrix $D_1$. To achieve a tight lower bound for WMD, the costs of moving the histograms $X_2[j]$, $j \in \{1 \ldots N_2\}$ to $X_1[i]$, $i \in \{1 \ldots N_1\}$ may further be computed, as illustrated in the flowchart of FIG. 2. Therefore, after computing $D_1$ in full, one may swap $X_1$ and $X_2$, and run the LC-RWMD algorithm once again, which produces an $N_2 \times N_1$ matrix $D_2$. The final distance matrix D is produced by computing the maximum values of the symmetric entries in $D_1$ and $D_2$ (i.e., D=max $(D_1, D_2^T)$).

When $O(N)=O(|V|)$, the LC-RWMD implementation reduces the average complexity of computing RWMD between a pair of histograms from $O(d^2M)$ to $O(dM)$. Such a reduction makes LC-RWMD orders of magnitude faster than the quadratic RWMD. When $O(N)=O(|V|)$, the reduction in complexity is given by $\min(Nd/|V|, dM)$, which is typically determined by the first term, i.e., $Nd/|V|$. As a result, using the LC-RWMD method has significant advantages when the size of the histograms d is large and/or the number of histograms N is larger than or equal to the number of words |V| in the vocabulary. In general, the present methods will provide a net advantage over prior art method when the factor Nd/|V| is larger than 1.

Next, an important optimization can be achieved for the LC-RWMD implementations by reducing the size of the vocabulary, which is achieved by eliminating words that do not appear in $X_1$. Similarly, when $X_1$ and $X_2$ are swapped to refine the distance results as described above, one may eliminate the words that do not appear in $X_2$ from the vocabulary.

2.3. Parallel Implementations of the LC-RWMD Method

The present Inventor has developed GPU-accelerated and distributed implementations of the linear-complexity RWMD algorithm as well as the more straightforward quadratic-complexity approach, and demonstrated excellent scalability for both.

Namely, one may parallelize the computation of a complete column of the pairwise distance matrix D, by storing all $T_1[i]$, $i \in \{1 \ldots N_1\}$ matrices in the GPU memory, and by performing pairwise RWMD computations across all $T_1[i]$, $i \in \{1 \ldots N_1\}$ and a single $T_2[j]$, $j \in \{1 \ldots N_1\}$ at once. The RWMD computations are performed using an adaptation of the implementation discussed in sect. 1. The Euclidean distance computations across all $T_1[i]$, $i \in \{1 \ldots N_1\}$ matrices and a single $T_2[j]$, $j \in \{1 \ldots N_2\}$ are performed by combining all $T_1[i]$, $i \in \{1 \ldots N_1\}$ in a single matrix $T_1$ with O(Nd) rows and M columns, and by using the so-called NVIDIA's CUBLAS library for multiplying it against $T_2[j]$. The row-wise and column-wise minimum operations are performed using NVIDIA's Thrust library. The dot-product operations are performed again using CUBLAS. Such an implementation requires O(NdM) space in the GPU memory because each $T_1[i]$ matrix requires O(dM) space, and we store O(N) such matrices simultaneously in the GPU memory.

In the first phase, the implementation of LC-RWMD uses the CUBLAS library for computing Euclidean distances between W and a single $T_2[j]$, $j \in \{1 \ldots N_2\}$, and then the Thrust library is used for computing row-wise minimums. In the second step, the NVIDIA's CUSPARSE library can be used for multiplying $X_1$ by the result of the first phase. Unlike the quadratic-complexity implementation, the linear-complexity RWMD does not store $T_1[f]$, $i \in \{1 \ldots N_1\}$ matrices in the GPU memory. Instead of allocating the dense $T_1$ matrix that stores embedding vectors for all the words in all the histograms in $X_1$, LC-RWMD simply stores the sparse matrix $X_1$, which requires O(Nd) space, and the embedding vectors for the complete vocabulary (i.e., W), which requires O(|V| M) space. Therefore, the overall space complexity of LC-RWMD is O(Nd+|V|M). When O(|V|)=O(N), the overall space complexity becomes O(Nd+NM). As a result, the space complexity of LC-RWMD is smaller than the space complexity of the quadratic-complexity RWMD by a factor of min(d, M). In conclusion, LC-RWMD not only reduces the time complexity by a factor of d with respect to the quadratic RWMD, but also reduces the space complexity by a similar factor.

Table III below gives a summary of these results.

TABLE III

Comparison of complexities of the LC-RWMD and RWMD

| Method | Time Complexity | Space Complexity |
|---|---|---|
| LC-RWMD | O(N|V|dM + N²d) | O(Nd + |V|M) |
| RWMD | O(N²d²M) | O(NdM) |
| Reduction | O(min(Nd/|V|, dM)) | O(min(Nd/|V|, M)) |

Finally, all the algorithms (as described in this section) are data-parallel and can easily be distributed across several GPUs. Spreading either $X_1$ or $X_2$ across several GPUs is sufficient. The only function that may require communication across multiple GPU nodes in a distributed setting is the top-K computation. However, the respective communication overhead is typically marginal compared to the cost of the distance computation algorithms.

2.4. Performance Evaluation

Table IV below summarizes the characteristics of the datasets used in the present experiments in terms of the number of documents (N) and the average number of unique words per document excluding the stop-words, which indicates the average histogram size (d). Both datasets are proprietary system of the Applicant.

The present algorithms require two datasets for comparison. The first set $X_1$ is resident (i.e., fixed) and the second set $X_2$ is transient (i.e., unknown). In the present experiments, the datasets given in Table IV are treated as resident sets. Given a second set of documents (i.e., $X_2$), one may compare it against $X_1$. In typical use cases, $X_1$ and $X_2$ are completely independent sets, e.g., one is the training set and the other is the test set. However, in the experiments presented, $X_2$ can be defined as a randomly selected subset of $X_1$ for the sake of simplicity. The experiments presented in this section use embedding vectors generated by word2vec, the vocabulary size is three million words (i.e., |V|=3 000 000), and each word vector is composed of 300 single-precision floating-point numbers (i.e., M=300). However, the number of embedding vectors the LC-RWMD algorithm stores in the GPU memory is given by the number of unique words that are found in the resident dataset. This number is called $V_{eff}$, the respective values are shown in Table IV.

The present algorithms have been deployed on a cluster of four IBM POWER8+ nodes, where each node had two-socket CPUs with 20 cores and 512 GB of CPU memory. In addition, each node had four NVIDIA Tesla P100 GPUs attached via NVLINK interfaces. Each P100 GPU has 16 GB of memory, half of which was used to store the resident data structures, and the rest for the temporary data structures. The POWER8+ nodes were connected via 100 Gb Infiniband interfaces. All code was written in C++, the version 14.0.1 of IBM's XL C/C++ compiler was used to build the code, CUDA 8.0 was used to program the GPUs, and IBM's Spectrum MPI was used for inter-node and inter-process communication.

TABLE IV

Characteristics of the datasets used in experiments

| Data set | N | d (average) | Veff |
|---|---|---|---|
| BDS News | 1.M | 107.5 | 452058 |
| CDS News | 2.8M | 27.5 | 292492 |

Note that the first step of WMD is to compute the Euclidean distances. This step too can be GPU-accelerated. The second step uses a recent EMD library [5], which offers a single threaded CPU implementation. However, it is possible to run multiple EMD computations in parallel, across different pairs of histograms using multiple CPU threads.

Two datasets (hereafter called BDS and CDS) were considered, each related to financial portal news, for the purpose of testing the present methods. The results obtained show that the current implementation of WMD (which implementation, again, is not prior art per se) is two to three orders of magnitude slower than the single-GPU implementation of the quadratic-complexity RWMD (which implementation is not prior art either), when applied to the CDS dataset. As expected, the factor of slowdown increases with K, which has a significant impact on the efficiency of pruning. When K=N, there is effectively no pruning. The observed slowdown was much higher for the BDS dataset because of the larger average histogram size of this dataset. In fact, using the BDS dataset, the present Inventor was not able to collect WMD results for K>100, as this would require several weeks of execution time. As one realizes, such a high cost renders WMD impractical for real-life applications.

The ratio of overlap between the top-K results of WMD and the top-K results of RWMD was investigated. The results obtained have shown that the RWMD ratio of overlap varies between 0.72 and 1, illustrating that RWMD can be a high-quality approximation to WMD, at least in the implementation adopted here. On the contrary, WCD overlap ratios were found to be as low as 0.13, which tends to confirm that WCD is not a high-quality approximation to WMD.

Finally, a preferred implementation of the LC-RWMD method was compared with a quadratic complexity implementation of RWMD, i.e., having quadratic complexity in terms of runtime performance. Were notably investigated the average times to compute the distances between a single transient histogram and: on the one hand, one million resident histograms from the BUS dataset; and 2.8 million resident histograms from the CDS dataset. As it turned out, the LC-RWMD was faster than the quadratic RWMD typically by a factor of d, as expected. Now, when running LC-RWMD on a single GPU, the time to compute one million distances was on the order of 100 milliseconds for the BDS dataset. For the CDS dataset, which has significantly smaller histograms, 2.8 million distances could be computed in about 80 milliseconds only. Both the quadratic RWMD and the LC-RWMD were shown to benefit from parallelization on multiple GPUs. Both are data-parallel algorithms and show linear speed-up as the number of GPUs increases. Note that either the resident dataset or the transient dataset can be distributed across multiple GPUs. With the quadratic RWMD, storage requirements per histogram are much higher, which means that fewer histograms can be fit into the GPU memory. When the complete resident set does not fit into the GPU memory, the resident histograms need be copied into the GPU memory in several chunks, which creates additional runtime overhead. To minimize this overhead, one may distribute the resident set when multiple GPUs are available. For instance, when using 16 GPUs, the CDS dataset completely fits into the distributed GPU memory, and the copy overheads are completely eliminated, which results in super-linear speedup for the quadratic RWMD. In case of the LC-RWMD, the data structures are much more compact, and millions of histograms can be stored in the memory of a single GPU. When several GPUs are available, distributing the resident dataset does typically not result in a linear speed-up. However, distributing the transient dataset across several GPUs and replicating the resident dataset on all the GPUs leads to a linear speedup, especially if the transient dataset is much larger than the resident dataset.

2.5. Final Remarks

As disclosed in the present document, it is possible to design high-quality (RWMD-like) methods for assessing distances between pairs of documents, which can be efficiently implemented. In particular, embodiments of such methods, such as the LC-RWMD method, can be implemented in linear time (on average) when computing distances across large sets of documents. Practical implementations of the present methods were further shown to map well onto commonly used, dense and sparse linear algebra routines, and to efficiently execute on CPUs and/or GPUs. In addition, such implementations can be efficiently scaled out across several CPUs and/or GPUs and exhibit a perfect strong scaling or weak scaling behavior. Lastly, and as the present Inventor has further observed, the accuracy of the underlying, RWMD-like algorithm is preserved.

The LC-RWMD method presented applies row-wise or column-wise reductions using minimum operations. However, it is possible to use of other types of reduction methods once the pairwise distances are computed between word vectors. For instance, the LC-RWMD can also use the maximum distance in each row/column or the sum of all the distances in each row/column.

a. Technical Implementation Details 3.1 Computerized System and Devices

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software, hardware, or a combination thereof. In exemplary embodiments, the methods described herein are implemented in software, as an executable program, the latter executed by suitable digital processing devices. More generally, embodiments of the present invention can be implemented wherein virtual machines and/or general-purpose digital computers, such as personal computers, workstations, etc., are used.

For instance, the system depicted in FIG. 7 schematically represents a computerized unit 101, e.g., a general-or specific-purpose computer.

In exemplary embodiments, in terms of hardware architecture, as shown in FIG. 7, the unit 101 includes at least one processor 105, and a memory 110 coupled to a memory controller 115. Preferably though, several processors (CPUs, and/or GPUs) are involved, to allow parallelization, as discussed earlier. To that aim, the processing units may be assigned respective memory controllers, as known per se.

One or more input and/or output (I/O) devices 145, 150, 155 (or peripherals) are communicatively coupled via a local input/output controller 135. The input/output controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor(s) 105 is a hardware device for executing software, particularly that stored in memory 110. The processor(s) 105 can be any custom made or commercially available processor(s), may include one or more central processing units (CPUs) and/or one or more graphics processing units (GPUs), or, still, have an architecture involving auxiliary processors among several processors associated with the computer 101. In general, it may involve any type of semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor(s) 105.

The software in memory 110 may include one or more separate programs, each of which comprises an ordered listing of executable instructions for implementing :logical functions. In the example of FIG. 7, the software in the memory 110 includes computerized methods, forming part of all of methods described herein in accordance with exemplary embodiments and, in particular, a suitable operating system (OS) 111. The OS 111 essentially controls the execution of other computer programs and provides scheduling, input-output control, file and data management, memory management, and communication control and related services.

The methods described herein (or part thereof) may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard and mouse can be coupled to the input/output controller 135. Other I/O devices 140-155 may be included. The computerized unit 101 can further include a display controller 125 coupled to a display 130. In exemplary embodiments, the computerized unit 101 can further include a network interface or transceiver 160 for coupling to a network, to enable, in turn, data communication to/from other, external components.

The network transmits and receives data between the unit 101 and external devices. The network is possibly implemented in a wireless fashion, e.g., using wireless protocols and technologies, such as Wifi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, an Internet of things network, etc.

If the unit 101 is a PC, workstation, intelligent device or the like, the software in the memory 110 may further include a basic input output system (BIOS). The BIOS is stored in ROM so that the BIOS can be executed when the computer 101 is activated. When the unit 101 is in operation, the processor(s) 105 is(are) configured to execute software stored within the memory 110, to communicate data to and from the memory 110, and to generally control operations of the computer 101 pursuant to the software.

The methods described herein and the OS 111, in whole or in part are read by the processor(s) 105, typically buffered within the processor(s) 105, and then executed. When the methods described herein are implemented in software, the methods can be stored on any computer readable medium, such as storage 120, for use by or in connection with any computer related system or method.

3.2 Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, valiant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

REFERENCES

[1] Tomas Mikolov, Kai Chen, Greg Corrado, and Jeffrey Dean. Efficient estimation of ord. representations in vector space. *CoRR*, abs/1301,3781 2013.

[2] Matt J. Kusner, Yu Sun, Nicholas I. Kolkin, and Kilian Q. Weinberger. From word embeddings to document distances. In *Proceedings of the 32nd International Conference on Machine Learning, ICML* 2015, Lille, France, 6-11 Jul. 2015, pages 957-966, 2015.

[3] Yossi Rubner, Carlo Tomasi, and Leonidas J Guibas. A metric for distributions with applications to image databases. In *Computer Vision*, 1998. *Sixth International Conference on*, pages 59-66. IEEE, 1998.

Peter Bickel Elizave a Levina. The earth mover's distance is the mallows distance: Some insights from statistics. In *Proceedings ICCV,* 2001.

[5] Ofir Pele and Michael Werman. *FastEarth Mover's Distance (EMD) Code,* 2013. http://www.ariel.ac.il/sites/ofirpele/FastEMD/code/.

What is claimed is:

1. A computer-implemented method for searching for information based on assessed distances between pairs of documents, the method comprising:

accessing a vocabulary V of words;

generating a representation suitable for parallel processing for each document to assess the distances between pairs of documents, wherein each representation is based on a set $X_k$, k=1, 2 of a histogram of words, wherein each of the two sets $X_k$, k=1, 2, is representable as a sparse matrix, each row of which corresponds to a histogram $X_k[l] \in X_k$, $l \in \{1, \ldots, N_k\}$, wherein $\in$ means contained in and wherein each histogram $X_k[l]$ is representable as a sparse vector, whose dimension is determined by a dimension of the vocabulary V;

using at least two graphics processing units (GPUs), parallel computing distances between pairs of histograms $(X_1[i], X_2[j])$, $\forall$ i $\in\{1, \ldots, N_1\} \wedge \forall j \in \{1, \ldots, N_2\}$, wherein $\forall$ means for all, by:

computing, for each histogram $X_2[j] \in X_2$ and for each word in V, a distance between said each word in V and a closest entry in said each histogram $X_2[j]$, to obtain a dense, floating-point vector y, whose dimension is determined by the dimension of the vocabulary V; and computing, for said each histogram $X_2[j] \in X_2$, a sparse-matrix, dense-vector multiplication between a matrix-representation of the set $X_1$ of histograms and the vector y, as a matrix-vector product, to obtain distances between all histograms $X_1[i]$, $i \in \{1, \ldots, N_1\}$ of the set $X_1$ and said each histogram $X_2[j]$, based on which distances between pairs of documents can be assessed;

assessing the distances between the pairs of documents;

searching a database comprising the documents based on the assessed distances; and providing one or more of the documents to a user based on results of the search via a computerized graphical user interface.

2. The method according to claim 1, wherein the distance between said each word in V and a closest entry in said each histogram $X_2[j]$, as computed for each histogram $X_2[j] \in X_2$ and for each word in V is a Euclidean distance.

3. The method according to claim 1, wherein, at computing the distance between said each word in V and the closest entry in said each histogram $X_2[j]$, the vector y is computed based on: a dense matrix W that stores vector representations of words in the vocabulary V, and a dense matrix $T_2[j]$ that stores vector representations of words in each histogram $X_2[j]$.

4. The method according to claim 1, wherein the vocabulary V accessed is processed, prior to computing said distance between each word in V and a closest entry in said each histogram $X_2[j]$ for each histogram $X_2[j] \in X_2$ and for each word in V, so as for the processed vocabulary to comprise a set of unique words used in the union of the two sets $X_2$ and $X_1$ of histograms.

5. The method according to claim 1, wherein pairs of steps of computing the distance between said each word in V and a closest entry in said each histogram $X_2[j]$ and computing the dense-vector multiplication between the matrix-representation of the set $X_1$ and the vector y are computed in parallel, for said each histogram $X_2[j] \in X_2$.

6. The method according to claim 1, wherein a ratio $N_1 d_1/|V|$ is larger than or equal to 1, wherein $N_1$ is a number of histograms of the set $X_1$, $d_1$ is an average dimension of histograms of this set, and $|V|$ is a dimension of the vocabulary V, || meaning absolute value of.

7. The method according to claim 1, wherein each of the two sets $X_2$ and $X_1$ accessed comprises at least 10,000 histograms.

8. The method according to claim 1, wherein one or more of the histograms of each of the sets $X_2$ and $X_1$ accessed comprises at least 10,000 distinct words.

9. A computer-implemented method for searching for information based on assessed distances between pairs of documents, the method comprising:

accessing:

two sets $X_2$ and $X_1$ of histograms of words, each of the histograms pertaining to a respective document; and a vocabulary V of words, wherein each of the two sets $X_k$, k=1,2, is representable as a sparse matrix, each row of which corresponds to a histogram $X_k[l] \in X_k$, $l \in \{1, \ldots, N_k\}$, wherein $\in$ means contained in and wherein each histogram $X_k[l]$ is representable as a sparse vector, whose dimension is determined by a dimension of the vocabulary V;

using at least two graphics processing units (GPUs), parallel computing distances between pairs of histograms $(X_1[i], X_2[j])$, $\forall$ i $\in \{1, \ldots, N_1\} \wedge \forall j \in \{1, \ldots, N_2\}$, wherein $\forall$ means for all, by:

computing, for each histogram $X_2[j] \in X_2$, and for each word in V a distance between said each word in V and a closest entry in said each histogram $X_2[j]$, to obtain a dense, floating-point vector)), whose dimension is determined by the dimension of the vocabulary V; and computing, for said each histogram $X_2[j] \in X_2$, a sparse-matrix, dense-vector multiplication between a matrix-representation of the set $X_1$ of histograms and the vector y, as a matrix-vector product, to obtain distances between all histograms $X_1[i]$, $i \in \{1, \ldots, N_1\}$ of the set $X_1$ and said each histogram $X_2[j]$, based on which distances between pairs of documents can be assessed;

wherein, at computing the distance between said each word in V and the closest entry in said each histogram X2[j], the vector y is computed based on: a dense matrix W that stores vector representations of words in the vocabulary V, and a dense matrix T2[j] that stores vector representations of words in each histogram X2[j];

wherein, at computing the distance between said each word in V and the closest entry in said each histogram $X_2[j]$, the vector y is computed as min(W $\circ$ $T_2[j]^T$), where $\circ$ is a modified matrix multiplication operation, wherein distances are computed between word vectors of the dense matrix W and $T_2[j]^T$, and wherein row-wise minimums of W $\circ$ $T_2[j]^T$ are computed to obtain min(W $\circ$ $T_2[j]^T$), so as to derive minimal distances between the words in the vocabulary V and the words in $X_2[j]$, which minimal distances are stored in the vector y;

assessing the distances between the pairs of documents;

searching a database comprising the documents based on the assessed distances; and providing one or more of the documents to a user based on results of the search via a computerized graphical user interface.

10. The method according to claim 9, wherein
for each word w $\in \{1, \ldots, |V|\}$ in the vocabulary V, a row W[w] of the dense matrix W stores a vector of M floating point numbers obtained via a word embedding process, whereby each word w is mapped to a vectors of real numbers.

11. The method according to claim 10, wherein
said distances between pairs of histograms are computed so as for a time duration complexity of the method to be $O(N_2 |V| d_2 M + N_1 N_2 d_1)$, wherein O means order of, wherein $N_1$ and $N_2$ are respective numbers of histograms of the two sets, $d_1$ and $d_2$ are respective, average dimensions of histograms of the two sets, and $|V|$ is a dimension of the vocabulary V.

12. The method according claim 10, wherein
said distances between pairs of histograms are computed so as for a storage space complexity of the method to be $O(N_1 d_1 + |V| M)$, wherein O means order of, wherein $N_1$ is a number of histograms of the set $X_1$, $d_1$ is an average dimension of histograms of this set, and $|V|$ is a dimension of the vocabulary V.

13. The method according claim 10, wherein
said distances between pairs of histograms are computed so as for a time duration complexity of the method to be $O(N_2 |V| d_2 M + N_1 N_2 d_1)$, wherein O means order of, and a storage space complexity of the method to be $O(N_1 d_1 + |V| M)$, wherein $N_1$ and $N_2$ are respective numbers of histograms of the two sets, $d_1$ and $d_2$ are respective, average dimensions of histograms of the two sets, and $|V|$ is a dimension of the vocabulary V.

14. The method according to claim 9, wherein
the modified matrix multiplication operation performed comprises: computing a norm of each row of W and each row of each histogram $T_2[j]$; and multiplying W by the transpose of each histogram $T_2[j]$, in order to compute distances between each row of W and each row of each histogram $T_2[j]$.

15. A computer-implemented method for searching for information based on assessed distances between pairs of documents, the method comprising:
accessing:
two sets $X_2$ and $X_1$ of histograms of words, each of the histograms pertaining to a respective document; and
a vocabulary V of words,
wherein each of the two sets $X_k$, k=1,2 is representable as a sparse matrix, each row of which corresponds to a histogram $X_k[I] \in X_k$, $1 \in \{1, \ldots, N_k\}$, wherein $\in$ means contained in and wherein each histogram $X_k[I]$ is representable as a sparse vector, whose dimension is determined by a dimension of the vocabulary V;
using at least two graphics processing units (GPUs), parallel computing distances between pairs of histograms $(X_1[i], X_2[j])$, $\forall i \in \{1, \ldots, N_1\} \wedge \forall l \in \{1, \ldots, N_2\}$, wherein $\forall$ means for all, by:
computing, for each histogram $X_2[j] \in X_2$, and for each word in V, a distance between said each word in V and a closest entry in said each histogram $X_2[j]$, to obtain a dense, floating-point vector y, whose dimension is determined by the dimension of the vocabulary V; and
computing, for said each histogram $X_2[j] \in X_2$, a sparse-matrix, dense-vector multiplication between a matrix-representation of the set $X_1$ of histograms and the vector y, as a matrix-vector product, to obtain distances between all histograms X1[i], $i \in \{1, \ldots, N_1\}$ of the set $X_1$ and said each histogram $X_2[j]$, based on which distances between pairs of documents can be assessed;
wherein the vocabulary V accessed is processed, prior to computing said distance between each word in V and a closest entry in said each histogram $X_2[j]$ for each histogram $X_2[j] \in X_2$ and for each word in V, so as for the processed vocabulary to comprise a set of unique words used in the union of the two sets $X_2$ and $X_1$ of histograms, wherein the method further comprises, prior to computing distances between pairs $(X_1[i], X_2[j])$ of histograms, reducing the vocabulary V by removing words that do not appear in the set $X_1$ of histograms from the vocabulary V;
assessing the distances between the pairs of documents;
searching a database comprising the documents based on the assessed distances; and
providing one or more of the documents to a user based on results of the search via a computerized graphical user interface.

16. A computer-implemented method for searching for information based on assessed distances between pairs of documents, the method comprising:
accessing:
two sets $X_2$ and $X_1$ of histograms of words, each of the histograms pertaining to a respective document; and
a vocabulary V of words,
wherein each of the two sets $X_k$, k=1,2, is representable as a sparse matrix, each row of which corresponds to a histogram $X_k[I] \in X_k$, $1 \in \{1, \ldots, N_k\}$, wherein $\in$ means contained in and wherein each histogram $X_k[I]$ is representable as a sparse vector; whose dimension is determined by a dimension of the vocabulary V;
using at least two graphics processing units (GPUs), parallel computing distances between pairs of histograms $(X_1[i], X_2[j])$, $\forall i \in \{1, \ldots, N_2\} \wedge \forall j \in \{1, \ldots, N_2\}$, wherein $\forall$ means for all, by:
computing, for each histogram $X_2[j] \in X_2$, and for each word in V, a distance between said each word in V and a closest entry in said each histogram $X_2[j]$, to obtain a dense, floating-point vector y, whose dimension is determined by the dimension of the vocabulary V; and
computing, for said each histogram $X_2[j] \in X_2$, a sparse-matrix, dense-vector multiplication between a matrix-representation of the set $X_1$ of histograms and the vector y, as a matrix-vector product, to obtain distances between all histograms $X_1[i]$, $i \in \{1, \ldots, N_1\}$ of the set $X_1$ and said each histogram $X_2[j]$, based on which distances between pairs of documents can be assessed;
wherein pairs of steps of computing the distance between said each word in V and a closest entry in said each histogram $X_2[j]$ and computing the dense-vector multiplication between the matrix-representation of the set $X_1$ and the vector y are computed in parallel, for said each histogram $X_2[j] \in X_2$; and
wherein said pairs of steps are implemented using linear algebra primitives of general-purpose computing on graphics processing units and execution of such pairs of steps is distributed across a cluster of graphics processing units;
assessing the distances between the pairs of documents;
searching a database comprising the documents based on the assessed distances; and
providing one or more of the documents to a user based on results of the search via a computerized graphical user interface.

17. A computer-implemented method for searching for information based on assessed distances between pairs of documents, the method comprising:
  accessing:
    two sets $X_2$ and $X_1$ of histograms of words, each of the histogram; pertaining to a respective document; and
    a vocabulary V of words,
    wherein each of the two sets $X_k$, k=1,2, is representable as a sparse matrix, each row of which corresponds to a histogram $X_k[l] \in X_k$, $l \in \{1, \ldots, N_k\}$, wherein $\in$ means contained in and wherein each histogram $X_k[l]$ is representable as a sparse vector, whose dimension is determined by a dimension of the vocabulary V;
  using at least two graphics processing units (GPUs), parallel computing distances between pairs of histograms $(X_1[i], X_2[j])$, $\forall\ i \in \{1, \ldots, N_1\} \wedge \forall j \in \{1, \ldots, N_2\}$, wherein $\forall$ means for all, by:
    computing; for each histogram $X_2[j] \in X_2$, and for each word in V, a distance between said each word in V and a closest entry in said each histogram $X_2[j]$, to obtain a dense, floating-point vector y, whose dimension is determined by the dimension of the vocabulary V; and
    computing, for said each histogram $X_2[j] \in X_2$, a sparse-matrix, dense-vector multiplication between a matrix-representation of the set $X_1$ of histograms and the vector y, as a matrix-vector product, to obtain distances between all histograms $X_1[i]$, $i \in \{1, \ldots, N_1\}$ of the set $X_1$ and said each histogram $X_2[j]$, j], based on which distances between pairs of documents can be assessed;
  wherein the step of computing distances between pairs $(X_1[i], X_2[j])$, $\forall i \in \{1, \ldots, N_1\} \wedge \forall j \in \{1, \ldots, N_2\}$ of histograms is a first distance computation step, whereby distances resulting from the first distance computation step are stored in a first data structure representable as a $N_1 \times N_2$ matrix $D_1$, and wherein the method further comprises:
  a second distance computation step, wherein distances are computed between pairs $(X_2[j], X_1[i])$ of histograms, $\forall\ j \in \{1, \ldots, N_2\} \wedge \forall\ i \in \{1, \ldots, N_1\}$, by:
    computing; for each histogram $X_1[i] \in X_1$, and for each word in V, a distance between said each word in V and a closest entry in said each histogram $X_1[i]$, to obtain a dense, floating-point vector $y_2$, whose dimension is determined by the dimension of the vocabulary V; and
    computing, for said each histogram $X_1[i] \in X_1$, a sparse-matrix, dense-vector multiplication between a matrix-representation of the set $X_2$ of histograms and the vector $y_2$, as a matrix-vector product, to obtain distances between all histograms $X_2[j]$, $j \in \{1, \ldots, N_2\}$ of the set $X_2$ and said each histogram $X_1[i]$, whereby the obtained distances are stored in a second data structure representable as a $N_2 \times N_1$ matrix $D_2$,
  and wherein
    a third data structure is further obtained by computing maximum values of symmetric entries in matrices $D_1$ and $D_2$, the third data structure representable as a matrix D, such that $D = \max(D_1, D_2^T)$, wherein $D_2^T$ comprises transpose of $D_2$, whereby the distances between pairs of documents is assessed according to the third data structure obtained;
  assessing the distances between the pairs of documents;
  searching a database comprising the documents based on the assessed distances; and
  providing one or more of the documents to a user based on results of the search via a computerized graphical user interface.

18. The method according to claim 17; wherein
  the vocabulary taken into account for each of the first distance computation step and the second distance computation step is obtained from an initial vocabulary $V_0$ that comprises a set of unique words used in the union of the two sets $X_2$ and $X_1$ of histograms.

19. The method according to claim 18, wherein
  the vocabulary $V_1$ taken into account for the first distance computation step is obtained by removing words that do not appear in the set $X_1$ of histograms from the initial vocabulary $V_0$, and the vocabulary $V_2$ taken into account for the second distance computation step is obtained by removing words that do not appear in the set $X_2$ of histograms from the initial vocabulary $V_0$.

20. The method according to claim 17, wherein
  at the first distance computation step, each pair of steps of computing the distance between said each word in V and a closest entry in said each histogram $X_2[j]$ and computing the dense-vector multiplication between the matrix-representation of the set $X_1$ and the vector y, is computed in parallel, for said each histogram $X_2[j][j] \in X_2$, and
  at the second distance computation step, each pair of steps of computing the distance between said each word in V and a closest entry in said each histogram $X_1[i]$ and computing the dense-vector multiplication between the matrix-representation of the set $X_2$ and the vector y, is computed in parallel, for said each histogram $X_1[i] \in X_1$.

21. The method according to claim 17, wherein
  each of the first distance computation step and the second distance computation step is implemented using linear algebra primitives of general-purpose computing on graphics processing units, and execution of each of these steps is distributed across a cluster of graphics processing units.

22. A computer-implemented method for searching for information based on assessed distances between pairs of documents, the method comprising:
  accessing:
    two sets $X_2$ and $X_1$ of histograms of words, each of the histograms pertaining to a respective document; and
    a vocabulary V of words,
    wherein each of the two sets $X_k$, k=1,2, is representable as a sparse matrix, each row of which corresponds to a histogram $X_k[l] \in X_k$, $l \in \{1, \ldots, N_k\}$, wherein $\in$ means contained in and wherein each histogram $X_k[l]$ is representable as a sparse vector, whose dimension is determined by a dimension of the vocabulary V;
  using at least two graphics processing units (GPUs), parallel computing distances between pairs of histograms $(X_1[i], X_2[j])$, $\forall\ i \in \{1, \ldots, N_1\} \wedge \forall\ j \in \{1, \ldots, N_2\}$, wherein $\forall$ means for all; by:
    computing, for each histogram $X_2[j] \in X_2$, and for each word in V, a distance between said each word in V and a closest entry in said each histogram $X_2[j]$, to obtain a dense, floating-point vector y, whose dimension is determined by the dimension of the vocabulary V; and
    computing, for said each histogram $X_2[j] \in X_2$, a sparse-matrix, dense-vector multiplication between a matrix-representation of the set $X_1$ of histograms and the vector y, as a matrix-vector product; to obtain distances between all histograms $X_1[i]$, $i \in \{1, \ldots,$ $N_1$} of the set $X_1$ and said each histogram $X_2[j]$, based on which distances between pairs of documents can be assessed;

wherein the method further comprises:

storing, for each j, distances resulting from computing distances between pairs of histograms in a first data structure representable as a vector $D_1[:, j]$ whose dimension is equal to $N_1$, whereby each entry in the vector $D_1[:, j]$ is associated with an histogram of the set $X_1$;

sorting the first data structure $D_1[:, j]$ in ascending order of distances stored thereon, so as for a first entry to correspond to a smallest one of the distances stored in the vector $D_1[:, j]$;

cropping the first data structure $D_1[:, j]$ so as to obtain a first, cropped data structure $D^c_1[:, j]$, wherein only K entries are retained, which correspond to the K smallest distances of the first data structure $D_1[:, j]$;

identifying a reduced set $X^c_1$ of histograms associated to $D^C_1[:, j]$, based on histograms corresponding to distances stored in $D^C_1[:, j]$, wherein the reduced set $X^c_1$ corresponds to a reduced version of the first set $X_1$;

applying a quadratic-complexity, Relaxed Word Mover's Distance method to compute a cost of moving a $j^{th}$ histogram $X_2[j]$ of the second set X2 into the reduced set $X^C_1$ of histograms, so as to obtain a second data structure $D^C_2[:, j]$;

computing a quantity $D^C[:, j] = \max(D^C_1[:, j], D^C_2[:, j])$, based on which distances between pairs of documents can be assessed;

assessing the distances between the pairs of documents;

searching a database comprising the documents based on the assessed distances; and providing one or more of the documents to a user based on results of the search via a computerized graphical user interface.

23. A computer-implemented method of managing sets of documents, the method comprising:

given a set $X_1$ of histograms of words, each of the histograms pertaining to a respective document, whereby the set $X_1$ corresponds to a first set of documents as currently stored in a pool of documents, receiving a new set of documents, the latter being a second set of documents;

creating a corresponding set $X_2$ of histograms of words, each of the histograms pertaining to a respective one of the documents of the new set of documents received;

assessing distances between pairs of documents of the two sets, by:

accessing a vocabulary V of words;

generating a representation suitable for parallel processing for each document to assess the distances between pairs of documents, wherein each representation is based on a set $X_k$, k=1,2 of a histogram of words, wherein each of the two sets $X_k$, k=1, 2, is representable as a sparse matrix, each row of which corresponds to a histogram $X_k[l] \in X_k$, $l \in \{1, \ldots, N_k\}$, wherein $\in$ means contained in and wherein each histogram $X_k[l]$ is representable as a sparse vector, whose dimension is determined by a dimension of the vocabulary V; and using at least two graphics processing units (GPUs), parallel computing distances between pairs of histograms $(X_1[i], X_2[j])$, $\forall i \in \{1, \ldots N_1\} \wedge \forall j \in \{1, \ldots, N_2\}$, wherein $\forall$ means for all, by:

computing, for each histogram $X_2[j] \in X_2$, and for each word in V, a distance between said each word in V and a closest entry in said each histogram $X_2[j]$, to obtain a dense, floating-point vector y, whose dimension is determined by the dimension of the vocabulary V; and computing, for said each histogram $X_2[j] \in X_2$, a sparse-matrix, dense-vector multiplication between a matrix-representation of the set $X_1$ of histograms and the vector y, as a matrix-vector product, to obtain distances between all histograms $X_1[i]$, $i \in \{1, \ldots, N_1\}$ of the set $X_1$ and said each histogram $X_2[j]$, based on which distances between pairs of documents can be assessed;

searching a database comprising the documents based on the assessed distances; and providing one or more of the documents to a user based on results of the search via a computerized graphical user interface.

24. The method according to claim 23, further comprising, after having assessed distances between pairs of documents of the two sets:

storing the new set of documents in the pool of documents.

25. A computer program product for searching for information based on assessed distances between pairs of documents, the computer program product comprising a computer readable storage medium having program instructions embodied therewith, the program instructions executable by one or more processors, to cause to:

access a vocabulary V of words;

generating a representation suitable for parallel processing for each document to assess the distances between pairs of documents, wherein each representation is based on a set $X_k$, k=1,2 of a histogram of words, wherein each of the two sets $X_k$, k=1,2, is representable as a sparse matrix, each row of which corresponds to a histogram $X_k[l] \in X_k$, $l \in \{1, \ldots, N_k\}$, wherein $\in$ means contained in and wherein each histogram $X_k[l]$ is representable as a sparse vector, whose dimension is determined by a dimension of the vocabulary V;

using at least two graphics processing units (GPUs), parallel compute distances between pairs of histograms $(X_1[i], X_2[j])$, $\forall l \in \{1, \ldots, N_1\} \wedge \forall j \in \{1, \ldots, N_2\}$, wherein $\forall$ means for all, by:

computing, for each histogram $X_2[j] \in X_2$, and for each word in V, a distance between said each word in V and a closest entry in said each histogram $X_2[j]$, to obtain a dense, floating-point vector y, whose dimension is determined by the dimension of the vocabulary V; and computing, for said each histogram $X_2[j] \in X_2$, a sparse-matrix, dense-vector multiplication between a matrix-representation of the set $X_1$ of histograms and the vector y, as a matrix-vector product, to obtain distances between all histograms $X_1[i]$, $i \in \{1, \ldots, N_1\}$ of the set $X_1$ and said each histogram $X_2[j]$, based on which distances between pairs of documents can be assessed;

assess the distances between the pairs of documents;

search a database comprising the documents based on the assessed distances; and providing one or more of the documents to a user based on results of the search via a computerized graphical user interface.

* * * * *